United States Patent
Haruta

(10) Patent No.: US 11,573,748 B2
(45) Date of Patent: Feb. 7, 2023

(54) INFORMATION PROCESSING APPARATUS AND INFORMATION PROCESSING SYSTEM TO CONTROL EMITTING LIGHT BASED ON ILLUMINATION INFORMATION

(71) Applicant: CANON KABUSHIKI KAISHA, Tokyo (JP)

(72) Inventor: Kenichirou Haruta, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 94 days.

(21) Appl. No.: 17/306,795

(22) Filed: May 3, 2021

(65) Prior Publication Data
US 2021/0357163 A1  Nov. 18, 2021

(30) Foreign Application Priority Data
May 13, 2020 (JP) .............................. JP2020-084710

(51) Int. Cl.
*G06F 3/12* (2006.01)
*H05B 47/10* (2020.01)

(52) U.S. Cl.
CPC .......... *G06F 3/1208* (2013.01); *G06F 3/1256* (2013.01); *H05B 47/10* (2020.01); *G06F 3/12* (2013.01)

(58) Field of Classification Search
CPC ........ G06F 3/1208; G06F 3/1256; G06F 3/12; H05B 47/10; H05B 47/125; H05B 47/19; Y02B 20/40

USPC ......................................................... 358/1.13
See application file for complete search history.

(56) References Cited

U.S. PATENT DOCUMENTS

| | | | |
|---|---|---|---|
| 6,339,214 B1 * | 1/2002 | Takakura | H04N 1/0305 358/474 |
| 2014/0160538 A1 * | 6/2014 | Tanaka | H04N 1/40056 358/475 |

FOREIGN PATENT DOCUMENTS

| | | |
|---|---|---|
| JP | 2002218266 A | 8/2002 |
| JP | 2017208239 A | 11/2017 |

* cited by examiner

*Primary Examiner* — Darryl V Dottin
(74) *Attorney, Agent, or Firm* — Canon U.S.A., Inc. IP Division

(57) ABSTRACT

An information processing system includes an information apparatus configured to process information and a lighting apparatus configured to emit light. The information apparatus includes a reading unit, a first acquisition unit, a second acquisition unit, and a generation unit. The reading unit is configured to read an image including predetermined information. The first acquisition unit is configured to acquire first illumination information from the predetermined information read by the reading unit. The second acquisition unit is configured to acquire second illumination information, which indicates capability information about the lighting apparatus. The generation unit is configured to generate third illumination information, which is to be transmitted to the lighting apparatus, based on the first illumination information and the second illumination information. The lighting apparatus controls emitting the light based on the third illumination information.

19 Claims, 24 Drawing Sheets

FIG.6A

< SELECTION OF PRINT JOB >

| JOB NAME | DATE AND TIME | NUMBER OF COPIES | USER NAME |
|---|---|---|---|
| catalog.pdf | 11/18 18:13 | 12 | working person 333 |

601

602 — PRINT SETTING

605 — PRINT START

FIG.6B

< PRINT SETTING >

- VIEWING ILLUMINATION INFORMATION PRINTING    NO    CHANGE — 603

< VIEWING ILLUMINATION INFORMATION PRINTING FUNCTION >

- Do you want to print a QR code with viewing illumination information embedded therein on an image?

YES — 604      NO — 607

FIG.6D

< INPUTTING OF VIEWING ILLUMINATION INFORMATION >

- Please enter viewing illumination information.

INPUTTING OF ILLUMINATION CONDITIONS

FIG.16A

< SELECTION OF PRINT JOB >

| JOB NAME | DATE AND TIME | NUMBER OF COPIES | USER NAME |
|---|---|---|---|
| catalog.pdf | 11/18 18:13 | 13 | 1334 |

1301

PRINT SETTING ~ 1302

PRINT START ~ 1305

FIG.16B

< PRINT SETTING >

- VIEWING ILLUMINATION INFORMATION PRINTING   NO   CHANGE ~ 1303

< VIEWING ILLUMINATION INFORMATION PRINTING FUNCTION >

- Do you want to print a QR code with viewing illumination information embedded therein on an image?

YES ~ 1304    NO ~ 1307

FIG.16D

< INPUTTING OF VIEWING ILLUMINATION INFORMATION >

- Please select an illumination lamp. ~ 1308

ILLUMINATION LAMP A

ILLUMINATION LAMP B

ILLUMINATION LAMP C

FIG.19A

< SELECTION OF PRINT JOB >

| JOB NAME | DATE AND TIME | NUMBER OF COPIES | USER NAME |
|---|---|---|---|
| catalog.pdf | 11/18 18:13 | 12 | working person 333 |

1501

1502 PRINT SETTING  1510 PREVIEW  1505 PRINT START

FIG.19B

< PRINT SETTING >

· VIEWING ILLUMINATION INFORMATION PRINTING    NO   CHANGE
1503

< VIEWING ILLUMINATION INFORMATION PRINTING FUNCTION >

· Do you want to print a QR code with viewing illumination information embedded therein on an image?

YES    NO
1504   1507

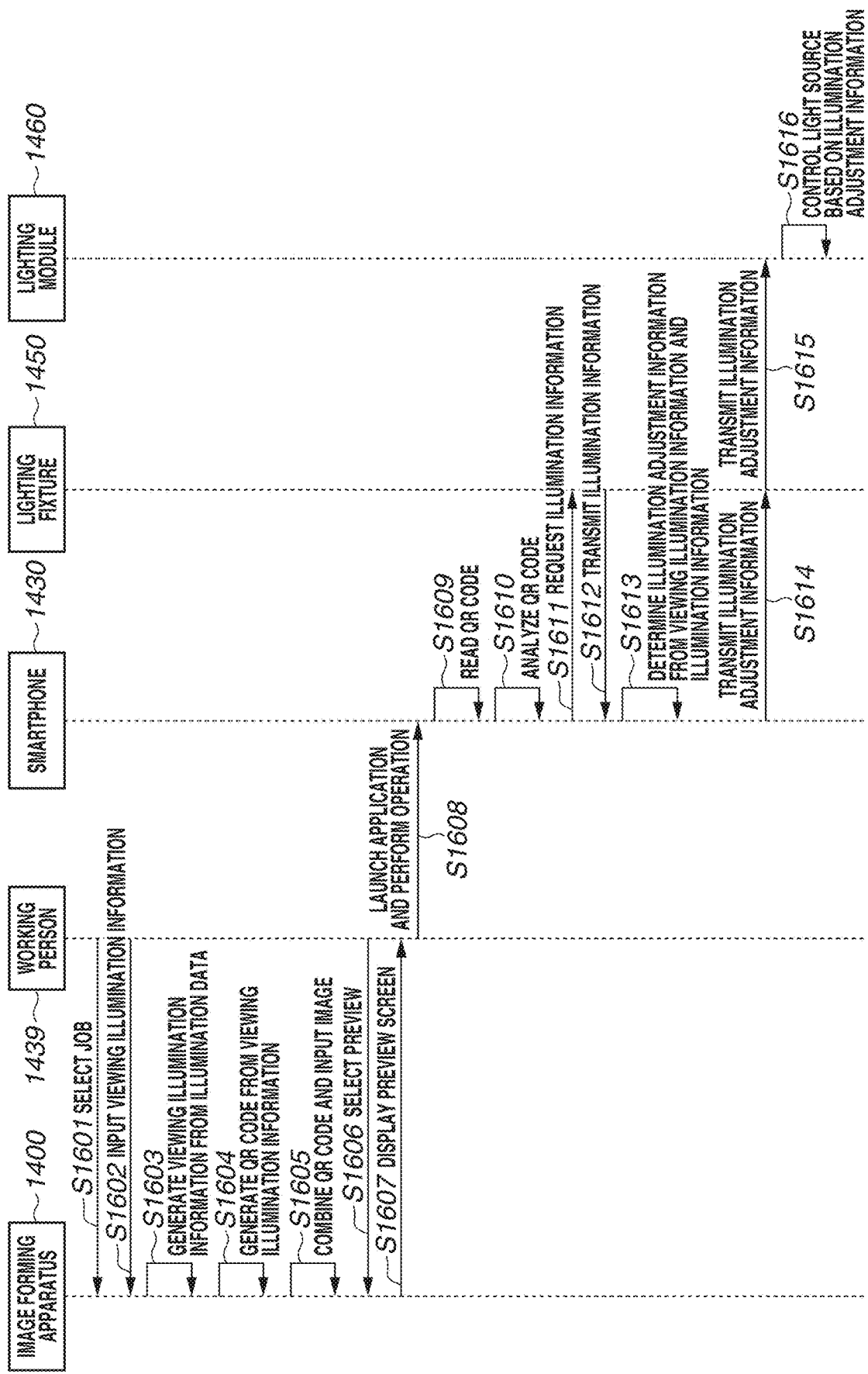

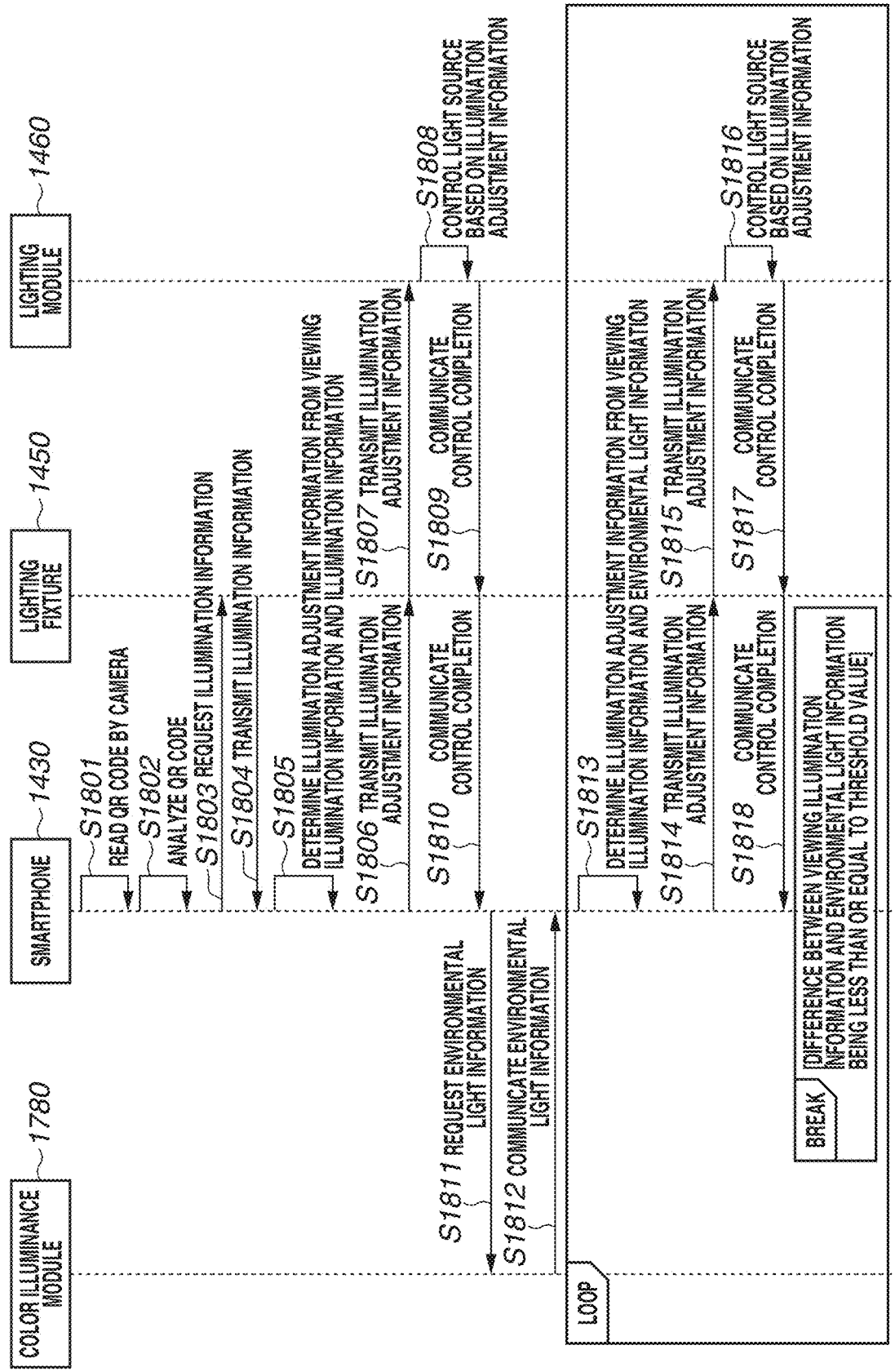

INFORMATION PROCESSING APPARATUS AND INFORMATION PROCESSING SYSTEM TO CONTROL EMITTING LIGHT BASED ON ILLUMINATION INFORMATION

BACKGROUND

Technical Field

One disclosed aspect of the embodiments generally relates to an information apparatus configured to process information and a lighting apparatus configured to emit light.

Description of the Related Art

In creating, for example, a poster or advertisement for commercial products, the user uses software for design to perform designing. Such software for design allows the user to designate colors or layouts of a background, characters, and contents. Then, the user enters design data into an output apparatus, such as a color printer, thus causing the output apparatus to perform print outputting of a poster or advertisement.

However, the appearance of color greatly varies with observation light sources. Therefore, even if the user has performed good-looking design on a monitor, the appearance of an output product viewed under a light source in a place for observing a poster or advertisement is not necessarily good.

For example, in a case where a light source in a place for putting a poster on display has a color tinted with red, such as that of an incandescent lamp, the poster looks reddish. Therefore, the color of the poster may look different from the one which a working person intends.

As one of methods for solving this issue, there is a technique discussed in Japanese Patent Application Laid-Open No. 2002-218266. This technique measures, with a measuring instrument, spectroscopic data about a color chart output from a target printer and spectroscopic data about an observation light source. Then, the technique creates a color profile with use of pieces of spectroscopic data about the color chart and the observation light source and applies the created color profile to color conversion, thus providing an environmental light correction function for performing color conversion suitable for a place for display.

However, the technique discussed in Japanese Patent Application Laid-Open No. 2002-218266 has an issue in which color profiles corresponding to all of the wide variety of light sources have to be previously created and, if such color profiles are loaded in a printer, the required data capacity becomes large. Moreover, while the working person is also able to directly create a color profile, since the working person is required to measure an observation light source with use of a dedicated measuring instrument, a load on the working person may become large.

Furthermore, in recent years, the Internet of Things (IoT), in which all devices are connected to the Internet to perform exchange of information, has been being developed remarkably. In the IoT, as long as a predetermined application is installed on a computer, IoT devices become able to be used via the computer. The IoT devices include a wide variety of devices, such as various sensors and things. Acquiring various pieces of information from such IoT devices arranged in a scattering manner within a predetermined area and analyzing the acquired pieces of information enables using such pieces of information for a variety of services. An apparatus which collects information from an IoT device can be configured to collect information directly from the IoT device or can be configured to collect information via an information processing apparatus.

Moreover, on the other hand, there is a known a lighting fixture which is capable of changing a light quantity and a correlated color temperature of light that is emitted for lighting, as discussed in, for example, Japanese Patent Application Laid-Open No. 2017-208239.

SUMMARY

According to an aspect of the disclosure, an information processing system includes an information apparatus configured to process information and a lighting apparatus configured to emit light. The information apparatus includes a reading unit, a first acquisition unit, a second acquisition unit, and a generation unit. The reading unit is configured to read an image including predetermined information. The first acquisition unit is configured to acquire first illumination information from the predetermined information read by the reading unit. The second acquisition unit is configured to acquire second illumination information, which indicates capability information about the lighting apparatus. The generation unit is configured to generate third illumination information, which is to be transmitted to the lighting apparatus, based on the first illumination information and the second illumination information. The lighting apparatus controls emitting the light based on the third illumination information.

Further features of the disclosure will become apparent from the following description of exemplary embodiments with reference to the attached drawings.

BRIEF DESCRIPTION OF THE DRAWINGS

FIGS. 6A, 6B, 6C, and 6D are diagrams illustrating examples of screens each of which is displayed on a display unit according to the first exemplary embodiment.

FIGS. 16A, 16B, 16C, and 16D are diagrams illustrating examples of screens each of which is displayed on a display unit in the second exemplary embodiment.

FIGS. 19A, 19B, 19C, 19D, and 19E are diagrams illustrating examples of screens each of which is displayed on a display unit in the third exemplary embodiment.

FIG. 20 is a sequence diagram illustrating viewing illumination information display processing in the third exemplary embodiment.

FIG. 23 is a sequence diagram illustrating viewing environmental illumination adjustment processing in the fourth exemplary embodiment.

DESCRIPTION OF THE EMBODIMENTS

Various exemplary embodiments, features, and aspects of the disclosure will be described in detail below with reference to the accompanying drawings. Furthermore, the following exemplary embodiments are not intended to limit the disclosure set forth in the claims, and, moreover, not all of the combinations of features described in each of the exemplary embodiments are necessarily essential for solutions in the disclosure. In the following description of exemplary embodiments, an image processing system and a mobile apparatus are used as examples of an information processing apparatus.

In a first exemplary embodiment, a method in which a working person checks and manages printing and color tone of an output product in a working place is described. Then, a method in which, when a viewing person views the output product in a viewing place, which is a place differing in illumination conditions from the working place, illumination in the viewing place is controlled in such way as to cause the output product to look the same appearance and color tone as in the working place is described.

<Description of Working Place 301>

Figure 1:
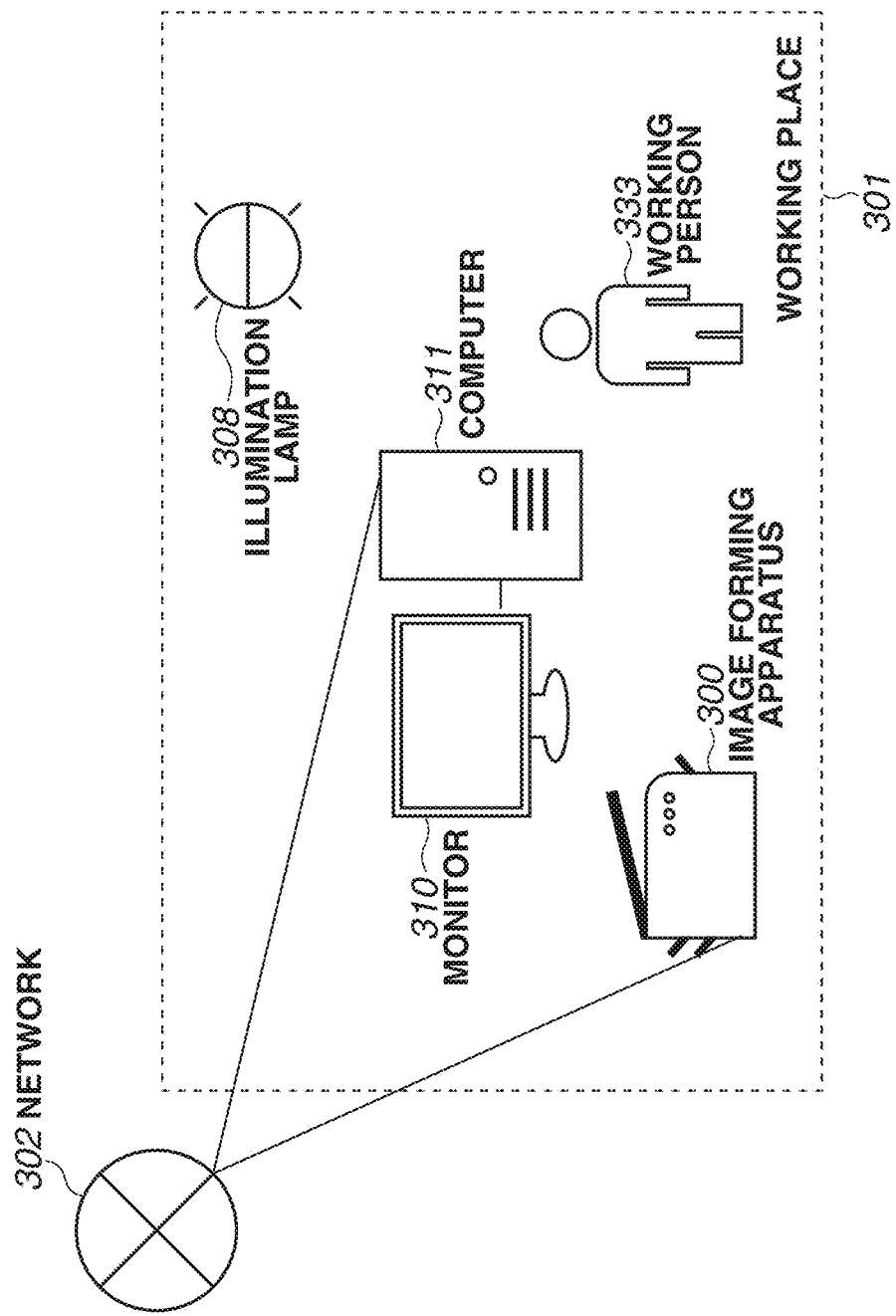
FIG. 1 is a block diagram illustrating an overall configuration of a working place according to a first exemplary embodiment.

FIG. 1 is a conceptual diagram illustrating an overall configuration of a working place 301 according to the first exemplary embodiment, and also illustrates a network 302 together with the working place 301. Moreover, the working place 301 in the first exemplary embodiment includes an image forming apparatus 300, a monitor 310, a computer 311, and an illumination lamp 308.

More specifically with regard to the above-mentioned configuration, the working place 301 is a place in which a working person 333 performs printing with use of the image forming apparatus 300. The network 302 is, for example, a local area network (LAN), the Internet, or an intranet, and can be wired or wireless. The communication standard (method) for the network 302 is, for example, Wi-Fi® communication or the fifth generation (5G) mobile communication system.

Next, in the working place 301, the image forming apparatus 300 is equivalent to an electrophotographic type color image forming apparatus or an inkjet apparatus, such as a digital copying machine, a laser beam printer individually equipped with a scanner, or a facsimile machine. The monitor 310 and the computer 311 are connected to the image forming apparatus 300 and constitute a host device for the image forming apparatus 300. Thus, to cause the image forming apparatus 300 to print, for example, an image displayed on the monitor 310, the computer 311 stores page description language (PDL) data for printing and inputs the PDL data to the image forming apparatus 300 via the network 302.

The working person 333 is a person who operates the computer 311 and the image forming apparatus 300 to print an image on a sheet of paper and then checks a color tone of an output product (printed product) under the illumination lamp 308 in the working place 301. The illumination lamp 308 is, for example, an incandescent lamp, a fluorescent lamp, or a light-emitting diode (LED) lamp, and is an apparatus which emits any type of light (artificial light).

<Configuration of Image Forming Apparatus 300>

Figure 2:
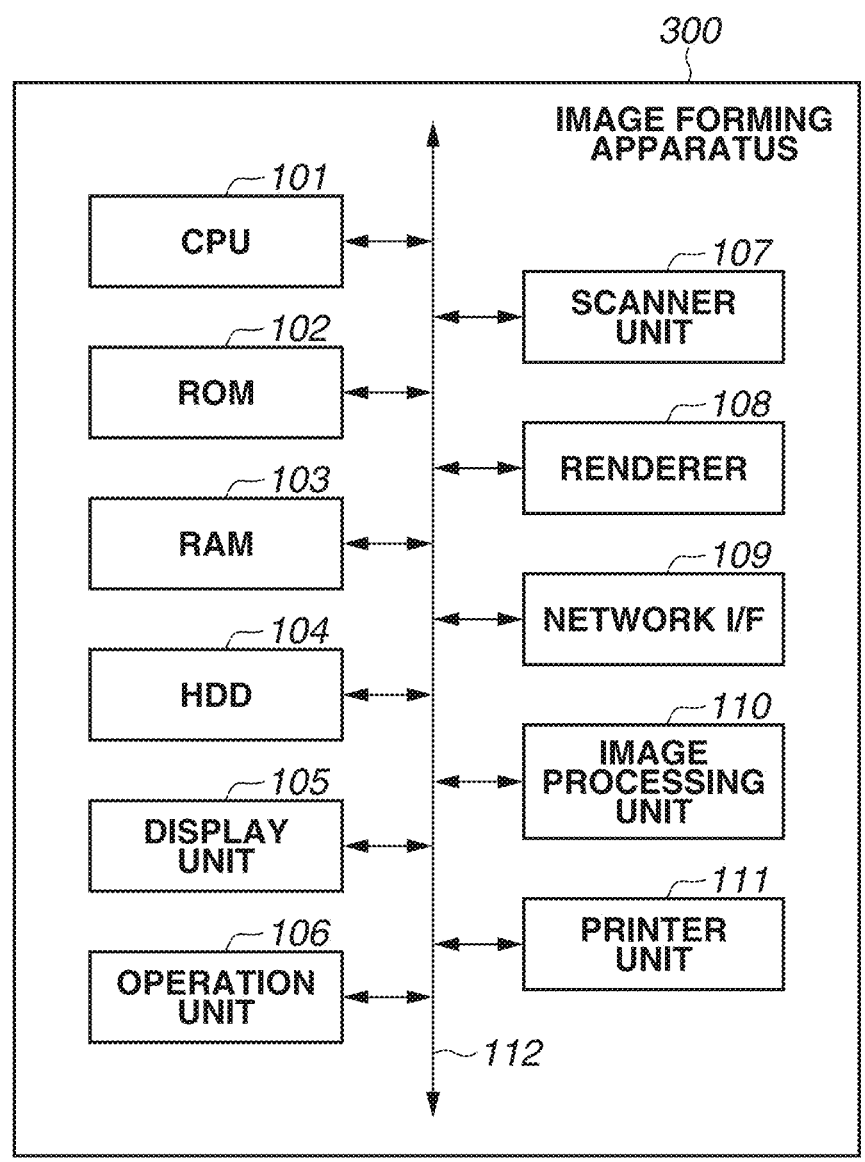
FIG. 2 is a block diagram illustrating a configuration of an image forming apparatus.

FIG. 2 is a block diagram illustrating a configuration of the image forming apparatus 300 according to the first exemplary embodiment.

The image forming apparatus 300 in the first exemplary embodiment includes a central processing unit (CPU) 101, a read-only memory (ROM) 102, a random access memory (RAM) 103, and a hard disk drive (HDD) 104. Additionally, the image forming apparatus 300 includes a display unit 105, an operation unit 106, a scanner unit 107, a renderer 108, a network interface (I/F) 109, an image processing unit 110, a printer unit 111, and a system bus 112.

More specifically with regard to the above-mentioned configuration, the CPU 101 is a central processing unit which performs, for example, control of the entire image forming apparatus 300 and computation processing, and performs various image processing operations described below based on a program stored in the ROM 102. The ROM 102 is a read-only memory and is a storage region for, for example, a system boot program, programs for controlling the scanner unit 107 and the printer unit 111, character data, and character code information.

The RAM 103 is a random access memory and is used for the programs and data stored in the ROM 102 to be loaded and executed by the CPU 101 in each of the various processing operations. Moreover, the RAM 103 is used as a data storage region for an image file received from the scanner unit 107 or the network I/F 109. The HDD 104 is composed of, for example, a hard disk and is used to store, for example, a result of processing performed by the CPU 101, programs, various information files, and print images. Moreover, the HDD 104 is also used as a work area when the CPU 101 performs processing. The ROM 102, the RAM 103, or the HDD 104 may store instructions or programs that, when executed by the CPU 101, perform operations, or function as operational units, as described in the following.

The display unit 105 is a unit or a device which performs screen display by, for example, a liquid crystal display, and is used to display, for example, a setting state of the image forming apparatus 300 and setting and error states of each unit of the image forming apparatus 300 such as the CPU 101. The operation unit 106 is a portion via which the working person 333 performs inputting of various instructions for, for example, changing or resetting of settings. Information about various instructions input by the operation unit 106 is stored in the RAM 103 and is used when the CPU 101 performs processing. Furthermore, in a case where the display unit 105 is a touch panel, the display unit 105 can be configured to receive inputting of various instructions for, for example, changing or resetting of settings.

The scanner unit 107 is a unit which converts reflected light obtained by radiating light onto an original into an electrical signal with use of, for example, a charge-coupled device (CCD) sensor having a red, green, and blue (RGB) matrix color filter to obtain RGB data corresponding to the original via, for example, a parallel (or serial) cable.

The renderer 108 generates a raster image (an RGB image or a cyan, magenta, yellow, and black (CMYK) image) based on an intermediate language generated by an interpreter 201 described below. The network I/F 109 is an interface via which to connect the image forming apparatus 300 to the network 302 illustrated in FIG. 1. Page description language (PDL) data is input from the computer 311 connected to the network 302 illustrated in FIG. 1 to the image forming apparatus 300 via the network I/F 109. PDL is a language which, at the time of printing, for example, text or an image created on a computer, describes an output image for a printer and issues an instruction to the printer to print the output image.

Typical examples of PDL include PostScript created by Adobe Systems. The image processing unit 110 is a portion which performs image processing suitable for a printer on image data generated by the renderer 108. The printer unit 111 is a portion which performs image formation of CMYK data configured with components of four colors, i.e., cyan, magenta, yellow, and black, processed by the image processing unit 110 on a paper medium by electrophotographic processes of exposure, latent image formation, development, transfer, and fixing. The system bus 112 interconnects the above-mentioned constituent elements and serves as a data path for use between them.

<Configurations of CPU 101 and Image Processing Unit 110>

Figure 3:
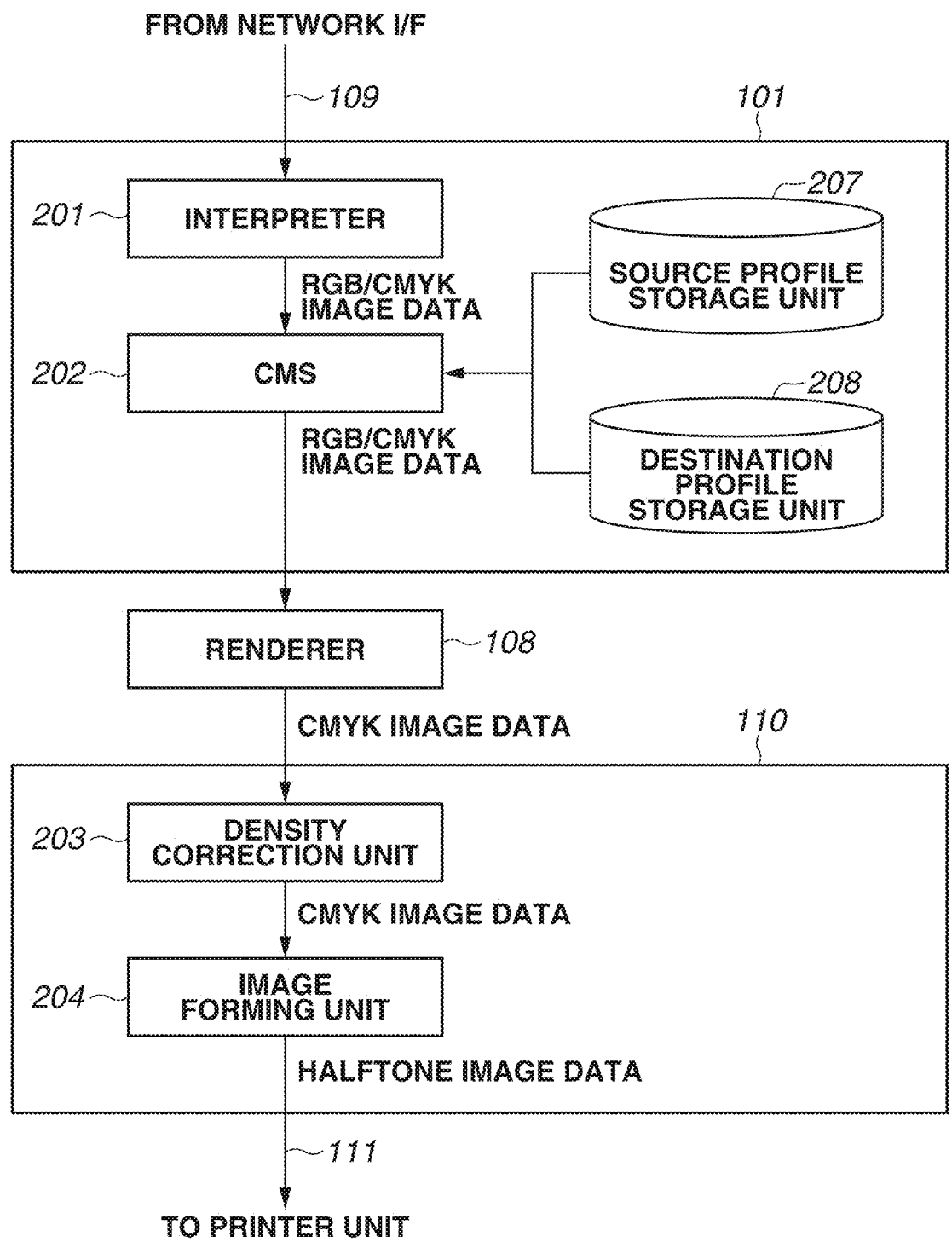
FIG. 3 is a block diagram illustrating configurations of a central processing unit (CPU) and an image processing unit.

FIG. 3 is a block diagram used to explain configurations of the CPU 101 and the image processing unit 110 according to the first exemplary embodiment. The configuration of a program which operates on the CPU 101 in the first exemplary embodiment includes an interpreter 201, a color management system (CMS) 202, a source profile storage unit 207, and a destination profile storage unit 208. Moreover, the configuration of the image processing unit 110 includes a density correction unit 203 and an image forming unit 204.

Furthermore, while, in the description of the first exemplary embodiment, the configuration of the CPU 101 performs respective processing operations by software and the configuration of the image processing unit 110 performs respective processing operations by hardware, a configuration in which all of the above-mentioned respective processing operations are performed by software processing or hardware processing can be employed.

Each module unit is executed by being triggered by, for example, an instruction received from the computer 311 via the network I/F 109. Thus, for example, in a case where instruction information for a printing operation has been input to the CPU 101 via the network I/F 109, the CPU 101 loads a program for starting the printing operation from the ROM 102 and each module unit is executed based on the program.

More specifically with regard to the above-mentioned configurations, the interpreter 201 interprets a page description language (PDL) portion of the received print data to generate intermediate language data (display list).

The CMS 202 performs color conversion using a source profile and a destination profile. Here, CMS is an abbreviation for color management system, which performs color conversion using information about a color profile described below. Moreover, the source profile is a color profile for converting a device-dependent color space, such as RGB or CMYK, into a device-independent profile connection space, such as L*a*b* (hereinafter referred to as "Lab") or XYZ created by the International Commission on Illumination (CIE). Furthermore, the device-independent profile connection space is called the Profile Connection Space (PCS).

XYZ is a device-independent color space as with Lab, and expresses colors with three types of stimulus values. Moreover, the destination profile is a color profile for converting a device-independent color space into a CMYK color space dependent on the printer unit 111 based on a designated matching method. Furthermore, typical methods for color conversion include the following methods:

Color tone priority—bringing color tone close to a screen of, for example, a display;
Color difference minimum—accurately outputting a designated color within a color reproduction range of a printer; and
Vividness priority—producing wholly vivid color.

Moreover, the CMS 202 can be configured to perform color conversion using a device link profile. Here, the device link profile is a color filter for directly converting a device-dependent color space, such as RGB or CMYK, into a CMYK color space dependent on the printer unit 111. A setting value set via the operation unit 106 is used to determine which color profile the CMS 202 uses to perform color conversion.

While, in the first exemplary embodiment, a single CMS 202 handles a plurality of types of color profiles, a configuration in which a plurality of CMSs 202 is selectively used depending on types of color profiles can be employed. Moreover, the types of color profiles are not limited to the examples mentioned in the first exemplary embodiment, and any types of color filters can be used as long as they use a CMYK color space device-dependent on the printer unit 111.

Moreover, the CMS 202 can be configured to perform color conversion by performing an interpolation computation using a multidimensional look-up table (LUT). For example, a three-dimensional LUT is a retrieval table representing a correspondence relationship for converting RGB data into CMYK data and is composed of N×N×N grid points and, therefore, can be used to accurately perform color conversion in principle as long as a grid interval is set sufficiently small.

However, since, in view of the issue of, for example, a memory capacity or processing speed, it is rare that a point at which to perform color conversion matches a grid point, the CMS 202 uses three-dimensional interpolation processing to obtain CMYK data. Even when converting CMYK data into CMYK data, the CMS 202 is able to perform color conversion in a similar way with use of a four-dimensional LUT.

The density correction unit 203 is a portion which performs correction processing for keeping the density characteristic of the printer unit 111 constant on CMYK data processed by the CMS 202. The image forming unit 204 is a portion which converts CMYK data corrected by the density correction unit 203 into a halftone image with N (where N is an integer) bits adapted for a printer and sends the halftone image to the printer unit 111. Furthermore, while the halftone processing includes various proposed methods such as a density pattern method, an organizational dither method, and an error diffusion method, the first exemplary embodiment can employ any method.

Moreover, the CPU 101 encodes information which is to be embedded in a printed product to generate a two-dimensional barcode. Furthermore, the two-dimensional barcode as generated herein is an example of a code image. In the first exemplary embodiment, information to be embedded is viewing illumination information. The viewing illumination information refers to illumination information indicating an illumination under which the working person 333 checked the color tone of a printed product produced by the image forming apparatus 300. The illumination information is capability information about an illumination lamp. Specifically, the illumination information is information composed of the range of correlated color temperature and the range of illuminance which are able to be generated by an illumination lamp. The CPU 101 combines the generated two-dimensional barcode and an output of the renderer 108 into a composite image and outputs the composite image to the image processing unit 110.

<Flowchart for Print Processing of Viewing Illumination Information>

Details of print processing of viewing illumination information are described with reference to FIG. 4, FIG. 5, and FIGS. 6A, 6B, 6C, and 6D.

Figure 4:
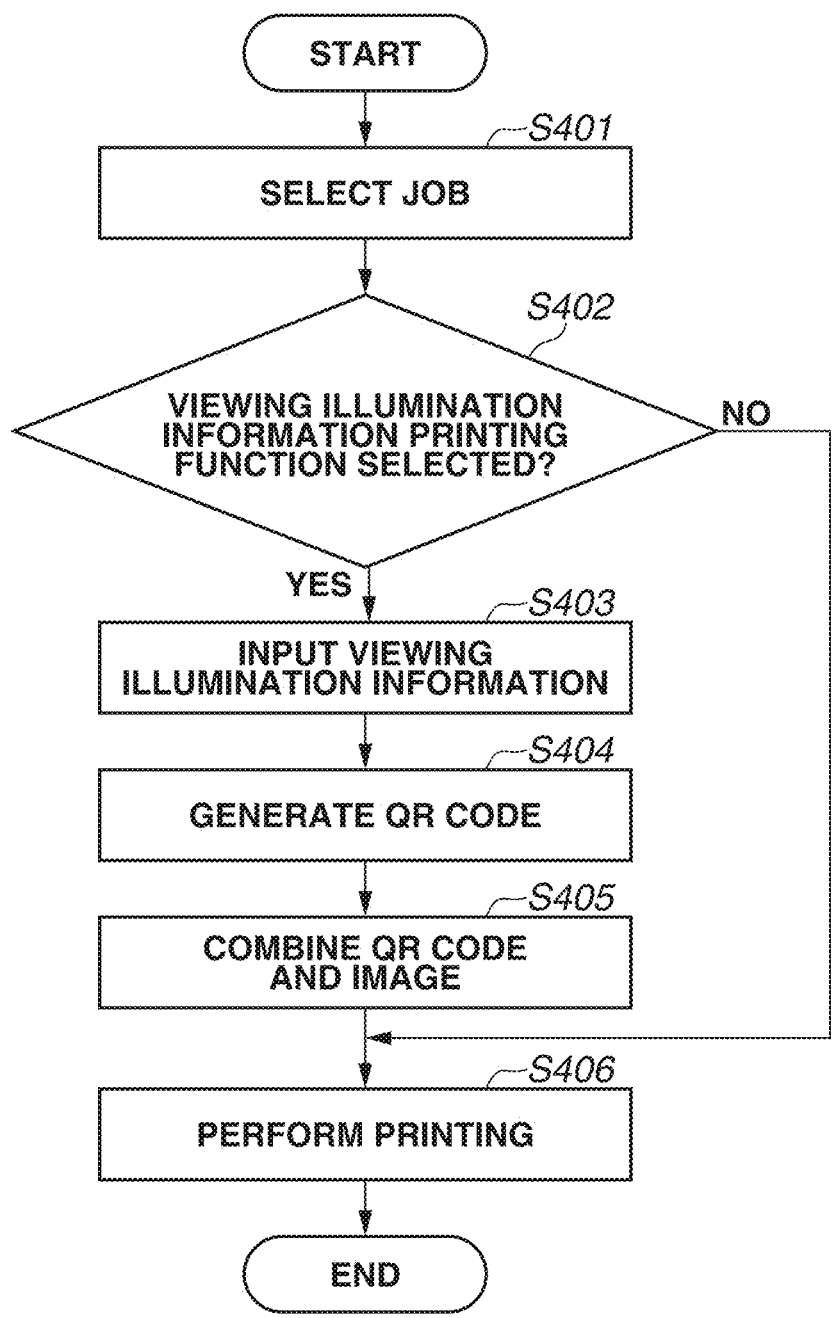
FIG. 4 is a flowchart illustrating a flow of viewing illumination information print processing according to the first exemplary embodiment.

FIG. 4 is a flowchart illustrating print processing of viewing illumination information in the first exemplary embodiment. The present flowchart is implemented by the CPU 101 loading a program for performing this processing flow from the ROM 102 onto the RAM 103 and executing respective module or functional units of the program.

The viewing illumination information is illumination information indicating an illumination under which the working person 333 checked the color tone of a printed product produced by the image forming apparatus 300. Specifically, the viewing illumination information is information composed of correlated color temperature and illuminance. The working person 333 is able to measure correlated color temperature and illuminance with use of, for example, a color illuminance meter.

A case where, in the first exemplary embodiment, the working person 333 has checked the color tone of a printed product at the working place 301 is described.

Figure 5:
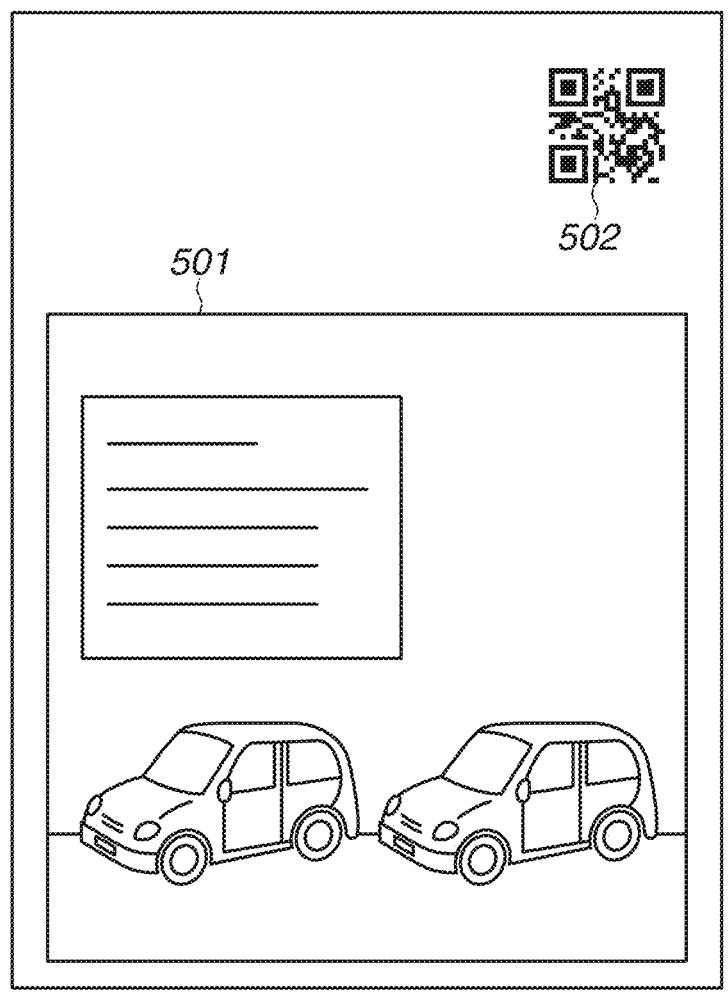
FIG. 5 is a diagram illustrating an example of an image obtained by combining a two-dimensional barcode and an input image in the first exemplary embodiment.

Under an illumination environment different from an illumination environment under which the working person 333 checked the color tone of a printed product, the printed product may, in some cases, not come to have a color tone intended by the working person 333. Therefore, the first exemplary embodiment is configured to print, on a printed product, information that is based on viewing illumination information. FIG. 5 illustrates an example of the printed product with the viewing illumination information printed thereon. Then, when the printed product is viewed at a place different from the working place 301, illumination is adjusted according to the viewing illumination information to bring the color tone of the printed product close to the color tone intended by the working person 333.

A printing flow for viewing illumination information is described as follows.

In step S401, the display unit 105 displays, for example, a screen illustrated in FIG. 6A. The operation unit 106 receives selection of an object 601 from the working person 333. This results in that a job "catalog.pdf" has been selected as an input job. The job "catalog.pdf" is a job previously transmitted from the computer 311 to the image forming apparatus 300.

In step S402, the display unit 105 displays the screen illustrated in FIG. 6A and the operation unit 106 receives selection of an object 602 from the working person 333. Next, the display unit 105 displays a screen illustrated in FIG. 6B and the operation unit 106 receives selection of an object 603 from the working person 333. Then, the display unit 105 displays a screen illustrated in FIG. 6C. The operation unit 106 receives selection of an object 604 from the working person 333. If a printing function for viewing illumination information (object 604) has been selected (YES in step S402), the printing flow proceeds to step S403 to input viewing illumination information. If the printing function for viewing illumination information has not been selected (an object 607 has been selected) (NO in step S402), the printing flow proceeds to step S406 to perform a printing operation.

In step S403, the display unit 105 displays a screen illustrated in FIG. 6D and prompts the working person 333 to manually input viewing illumination information. The working person 333 inputs correlated color temperature and illuminance as viewing illumination information. For example, the working person 333 performs measurement using a color illuminance meter and then inputs correlated color temperature "5000 kelvins (K)" and illuminance "30 lux (lx)".

In step S404, the CPU 101 encodes the viewing illumination information acquired in step S403 to generate a two-dimensional barcode.

In step S405, the CPU 101 combines the generated two-dimensional barcode and an image included in the job selected in step S401. FIG. 5 illustrates an example of a composite image obtained by combining an image 501 included in the selected job and the generated two-dimensional barcode 502. In step S406, the CPU 101 performs print processing to print the obtained composite image.

Next, a method of, in a viewing place 710, acquiring illumination information from the viewing illumination information printed in the printed product and adjusting illumination according to the acquired illumination information to bring the color tone of the printed product close to a color tone intended by the working person 333 is described with reference to FIG. 7.

<Description of Viewing Place 710>

Figure 7:
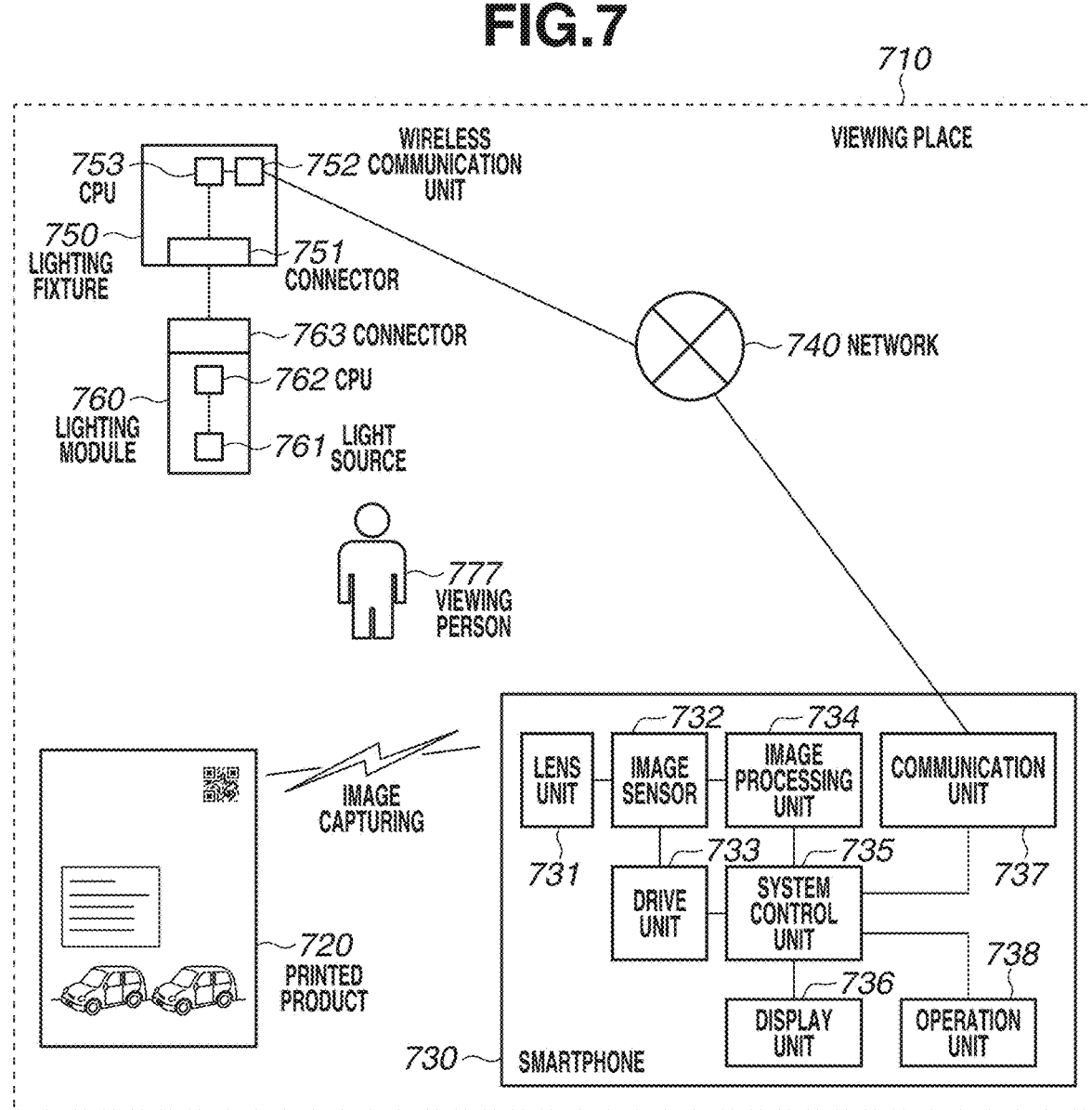
FIG. 7 is a conceptual diagram illustrating a configuration of a viewing place according to the first exemplary embodiment.

FIG. 7 is a conceptual diagram illustrating a configuration of the viewing place 710 in the first exemplary embodiment. The viewing place 710 includes a printed product 720, a smartphone 730, a network 740, a lighting fixture 750, and a lighting module 760.

More specifically with regard to the above-mentioned configuration, the viewing place 710 is a place at which a viewing person 777 views the printed product 720. The printed product 720 is an object produced by printing an image including, for example, text, a picture, or a photograph on a medium such as a sheet of paper by toner or ink with use of the image forming apparatus 300 illustrated in FIG. 2.

The network 740 is, for example, a LAN, the Internet, or an intranet and can be wired or wireless. The communication standard (method) is, for example, a Wi-Fi® communication or the 5G mobile communication system.

<Configuration of Smartphone 730>

The smartphone 730 includes a lens unit 731, an image sensor 732, a drive unit 733, an image processing unit 734, a system control unit 735, a display unit 736, a communication unit 737, and an operation unit 738. The lens unit 731 is configured integrally with the smartphone 730. The lens unit 731 guides a light flux received from a subject to the image sensor 732.

The drive unit 733 is a control circuit which controls driving of the image sensor 732 according to an instruction from the system control unit 735.

The image sensor 732 outputs pixel signals to the image processing unit 734.

The image processing unit 734 performs various image processing operations on data composed of pixel signals of the respective pixels to generate image data of a predetermined file format (for example, the Joint Photographic Experts Group (JPEG) format). The image processing unit 734 performs image processing operations, such as white balance adjustment, sharpness adjustment, gamma correction, and gradation adjustment, on RGB data. Moreover, the image processing unit 734 performs processing for compression using a predetermined compression format (for example, the JPEG format or the Moving Picture Experts Group (MPEG) format) as needed. Moreover, the image processing unit 734 outputs the generated image data to the display unit 736.

The display unit 736 displays an image captured by the image sensor 732 and various pieces of information.

The operation unit 738 includes various operation switches, which are operated by the viewing person 777. The operation unit 738 outputs a signal corresponding to an operation performed by the viewing person 777 to the system control unit 735.

The communication unit 737 is configured with an antenna for use in wireless communication and a modulation and demodulation circuit and a communication controller for use in processing a wireless signal. The communication unit 737 implements short-range wireless communication compliant with the standard of IEEE 802.15 (what is called Bluetooth®) by outputting a modulated wireless signal from the antenna or demodulating a wireless signal received via the antenna. Bluetooth® communication to be employed includes, for example, Version 4.0 of Bluetooth® Low Energy (BLE), which provides reduced power consumption. This Bluetooth® communication is narrow in a range available for communication (i.e., short in a distance available for communication) as compared with wireless LAN communication. Moreover, Bluetooth® communication is low in communication speed as compared with wireless LAN communication. On the other hand, Bluetooth® communication is small in power consumption as compared with wireless LAN communication. The smartphone 730 is able to perform exchange of data with an external apparatus via the communication unit 737. Other available communication standards (methods) include, for example, Wi-Fi® communication and the fifth generation mobile communication system (5G).

The system control unit 735 is a unit which controls the overall processing and operations of the smartphone 730 and is configured with a CPU and a memory.

<Configuration of Lighting Fixture>

The lighting fixture 750 is any type of lighting fixture configured to be connected to the lighting module 760, which is attachable and detachable, by a connector 751. The lighting fixture 750 can be, for example, a pendent lamp, a table lamp, a chandelier, an office lamp, a troffer, a portable lighting device, a fixed lighting device, a street light, a ceiling lighting fixture, or a wall lighting fixture.

The lighting fixture 750 includes a wireless communication unit 752. The wireless communication unit 752, which is a communication instrument, is connected to the network 740.

In a case where the lighting module 760 is attached to the lighting fixture 750, a CPU 753 of the lighting fixture 750 controls a light output operation of the lighting module 760.

The lighting module 760 includes at least one light source 761, which provides light output. The lighting module 760 includes a CPU 762, which is configured to determine whether the lighting module 760 is currently attached to the lighting fixture 750. For example, the CPU 762 is configured to control, for example, the hue, saturation, luminance, and color temperature of the lighting module 760.

The lighting module 760 includes a connector 763, which is configured to be connected to the connector 751 of the lighting fixture 750. Such an interface enables data communication and electric power transfer in one direction from the lighting fixture 750 to the lighting module 760 or in both directions between them. The connector 763 can be a Universal Serial Bus (USB) module. The connected USB module communicates, for example, its idVendor and idProduct, which are standardized USB descriptors, to the lighting fixture 750. This enables the lighting fixture 750 to identify (and control) the lighting module 760. The USB module can further communicate characteristics (for example, light-emitting characteristic, light-amount control characteristic, light color, beam shape, and sensing property) related to the applicable device to the lighting fixture 750.

<Description of Flowchart of Viewing Environmental Illumination Adjustment Processing>

Details of viewing environmental illumination adjustment processing are described with reference to FIG. 8, FIG. 9, and FIG. 10.

Figure 8:
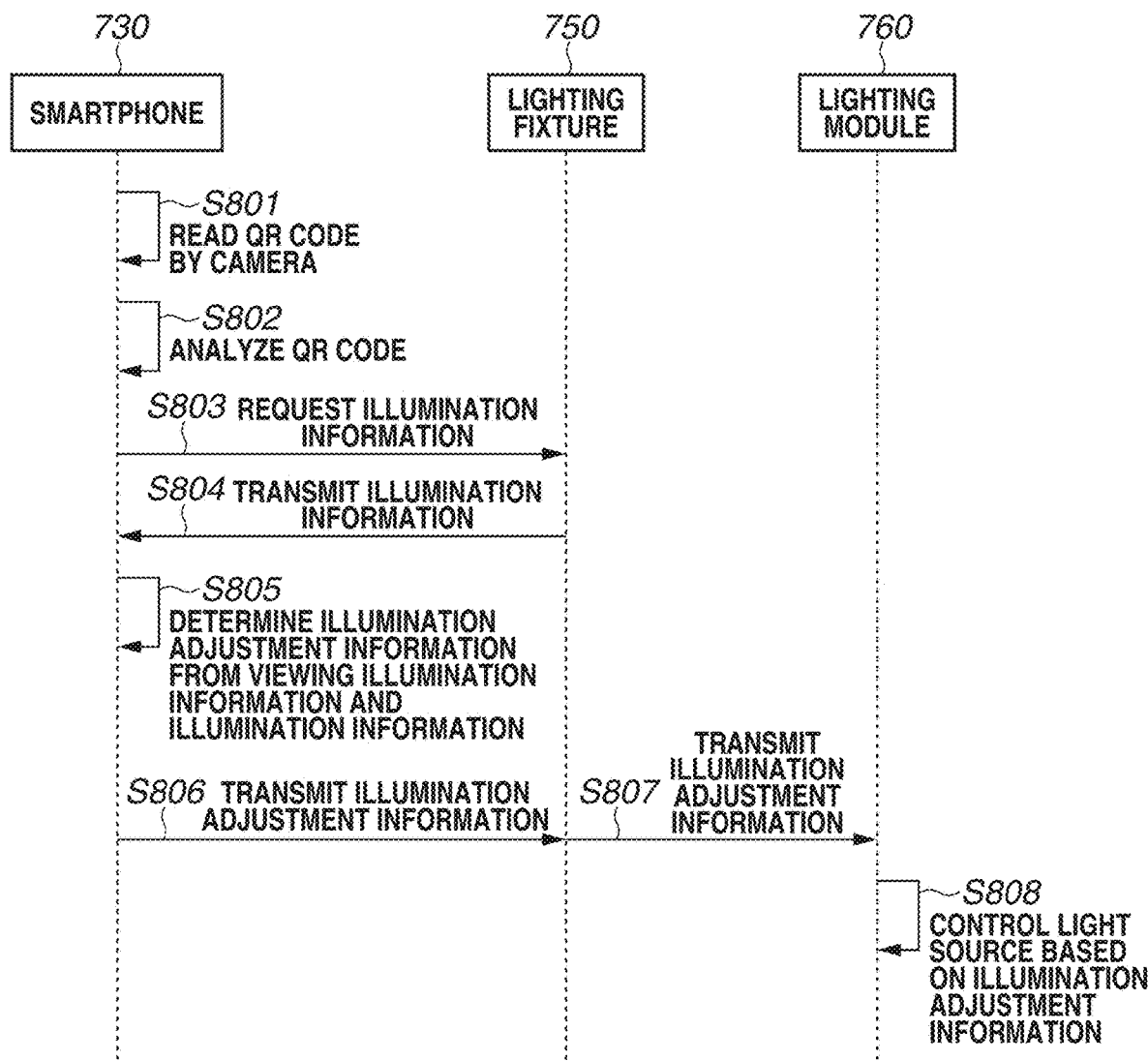
FIG. 8 is a sequence diagram illustrating viewing environmental illumination adjustment processing in the first exemplary embodiment.

FIG. 8 is a sequence diagram of viewing environmental illumination adjustment processing in the first exemplary embodiment.

Figure 9:
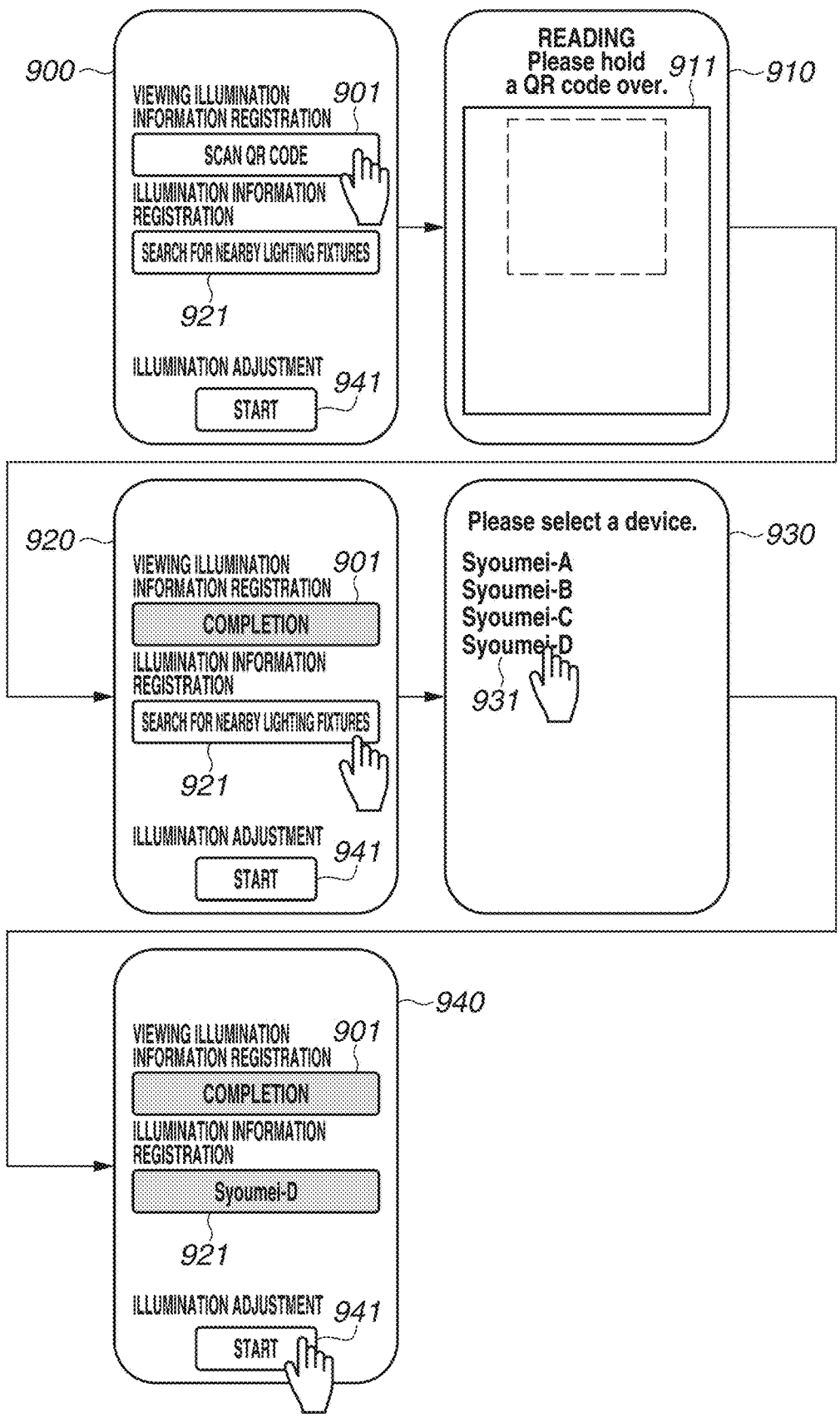
FIG. 9 is a diagram illustrating examples of screens of a smartphone in the first exemplary embodiment.

In step S801, the smartphone 730 displays a screen 900 illustrated in FIG. 9. The screen 900 is an example of a main screen of an application for performing adjustment processing of viewing environmental illumination.

An operation of, in the main screen, registering viewing illumination information and illumination information and pressing a "start" object for illumination adjustment enables adjusting the selected illumination lamp. In response to the viewing person 777 performing a touch operation on an object 901, the display unit 736 displays a screen 910. The screen 910 is a screen which is used to perform image capturing of a two-dimensional barcode with use of the smartphone 730.

An image capturing area screen 911 is a region which displays an image which is being captured by the smartphone 730. A guide frame indicating a position to which to fit a two-dimensional barcode is displayed in the image capturing area screen 911. Upon succeeding in reading of the two-dimensional barcode, the smartphone 730 ends reading processing of the two-dimensional barcode.

The description refers back to FIG. 8. In step S802, the system control unit 735 analyzes information read from the two-dimensional barcode. As a result of analysis, the system control unit 735 acquires, as viewing illumination information, information indicating correlated color temperature "5000 (K)" and illuminance "30 (lx)".

The system control unit 735 detects a two-dimensional barcode from image data acquired by scanning. While, here, a case where a two-dimensional barcode, which is a typical two-dimensional code, is used as a code image to be appended to an original is described as an example, the code image is not limited to the two-dimensional barcode. For example, the code image can be a one-dimensional code or an image obtained by coding specific information intended for, for example, document management or copying limitation, such as a digital watermark.

The system control unit 735 analyzes the two-dimensional barcode to acquire viewing illumination information and thus completes registration of the viewing illumination information.

In step S803, the smartphone 730 displays a screen 920. The screen 920 is a main screen. In response to the viewing person 777 performing a touch operation on an object 921, the display unit 736 displays a screen 930. The screen 930 displays a list of lighting fixtures, which are capable of communicating with the smartphone 730, present near the smartphone 730.

In response to the viewing person 777 performing a touch operation on an object 931, the smartphone 730 connects to the lighting fixture 750 via the communication unit 737 and the network 740, and requests illumination information about the lighting module 760. Here, the lighting fixture 750 is "Syoumei-D" 931.

In step S804, the lighting fixture 750 communicates illumination information about the lighting module 760 to the smartphone 730. The illumination information is information composed of correlated color temperature and luminous flux. The correlated color temperature of the lighting module 760 is, for example, 2200 (K) or more and 6500 (K) or less. The luminous flux of the lighting module 760 is, for example, 0 lumens (lm) or more and 800 (lm) or less.

In step S805, the smartphone 730 determines illumination adjustment information from the acquired viewing illumination information and the acquired illumination information. The illumination adjustment information is composed of correlated color temperature and light quantity. For example, the light quantity can be represented by a numerical value in the range of 0% to 100%. Furthermore, the light quantity can be represented by a luminous flux value or an illuminance value. In the first exemplary embodiment, the viewing illumination information includes correlated color temperature "5000 (K)" and illuminance "30 (lx)". Moreover, the correlated color temperature of the illumination information is 2200 (K) or more (lower limit) and 6500 (K) or less (upper limit). The luminous flux thereof is 0 (lm) or more (lower limit) and 800 (lm) or less (upper limit).

The system control unit 735 determines the luminous flux of the lighting module 760 from the illuminance of the viewing illumination information. First, the illuminance from a given light source is able to be obtained from the following equation (1).

$$\text{Illuminance (lx)} = \text{luminous flux (lm)} / \text{area (m}^2\text{)} \quad (1)$$

The luminous flux is able to be calculated from a floor area of the viewing place and a distance from the light source to the floor. In the first exemplary embodiment, the viewing place is assumed to be a common showroom. In the first exemplary embodiment, a case where, for example, a luminous flux directly falling on the floor is 30% of the entire emitted light flux and the floor area of the viewing place 710 is 10 (m$^2$) is described. Since the illuminance of the viewing illumination information is 30 (lx), assigning such conditions to equation (1) enables calculating the required luminous flux as shown in equations (2) and (3).

$$30 \text{ (lx)} = \text{luminous flux} \times 30(\%)/10 \text{ (m}^2\text{)} \quad (2)$$

$$\text{Luminous flux (lm)} = 30 \text{ (lx)} \times 10 \text{ (m}^2\text{)}/30(\%) = 1000 \text{ (lm)} \quad (3)$$

Accordingly, the required luminous flux is able to be determined to be 1000 (lm) from the viewing illumination information.

The above-mentioned calculation method for luminous flux is merely an example, and the floor area and the distance from a viewing object to a light source vary depending on viewing conditions.

<Flowchart of Illumination Adjustment Information Determination Processing>

Here, details of determination processing of illumination adjustment information in step S805 are described with reference to the flowchart of FIG. 10.

In step S1001, the system control unit 735 compares the viewing illumination information and the illumination information with each other to determine whether the viewing illumination information is within the range of the illumination information.

If it is determined that the viewing illumination information is within the range of the illumination information (YES in step S1001), the system control unit 735 advances the processing to step S1002. In step S1002, the system control unit 735 determines information received from the lighting fixture 750 as illumination adjustment information. If it is determined that the viewing illumination information is outside the range of the illumination information (NO in step S1001), the system control unit 735 advances the processing to step S1003. In step S1003, the system control unit 735 determines a value which is within the range of the illumination information and closest to the viewing illumination information as illumination adjustment information.

In step S1002, the system control unit 735 sets the value obtained from the viewing illumination information as illumination adjustment information.

In step S1003, the system control unit 735 sets the value which is within the range of the illumination information and closest to the viewing illumination information as illumination adjustment information.

The viewing illumination information includes correlated color temperature "5000 (K)" and required luminous flux "1000 (lm)". Moreover, the correlated color temperature of the illumination information is 2200 (K) or more and 6500 (K) or less. The luminous flux thereof is 0 (lm) or more and 800 (lm) or less.

Accordingly, since the viewing illumination information is outside the range of the illumination information, the system control unit 735 determines illumination adjustment information in step S1003. Since the correlated color temperature is within the range of the illumination information, the system control unit 735 determines that the correlated color temperature of the illumination adjustment information is 5000 (K). Next, since the required luminous flux is 1000 (lm) and is, therefore, outside the range of the illumination information, the system control unit 735 determines 800 (lm), which is the closest value, as a luminous flux of the illumination adjustment information.

Furthermore, for example, if the viewing illumination information is within the range of the illumination information, the illumination adjustment information becomes the same as the viewing illumination information. Specifically, for example, in a case where the correlated color temperature of the illumination information is 2200 (K) or more and 6500 (K) or less and the luminous flux thereof is 0 (lm) or more and 800 (lm) or less, the viewing illumination information includes correlated color temperature "5000 (K)" and required luminous flux "500 (lm)".

Here, the description refers back to adjustment processing of viewing environmental illumination illustrated in FIG. 8.

In step S806, the smartphone 730 transmits the illumination adjustment information to the lighting fixture 750.

In step S807, the lighting fixture 750 transmits the illumination adjustment information to the lighting module 760.

In step S808, the lighting module 760 controls the light source 761 based on the received illumination adjustment information.

Adjusting an illumination lamp according to the viewing illumination information enables bring an illumination environment under which the working person 333 checked the color tone of a printed product produced by the image forming apparatus 300 and an illumination environment in the viewing place 710 close to each other. With this processing, even in a place different from a place at which the working person 333 checked the color tone of the printed product, it becomes possible to view the same color and, thus, it is possible to provide a color intended by the working person 333 even in a different place.

<Screen Control by Display Unit 105>

Figure 11:
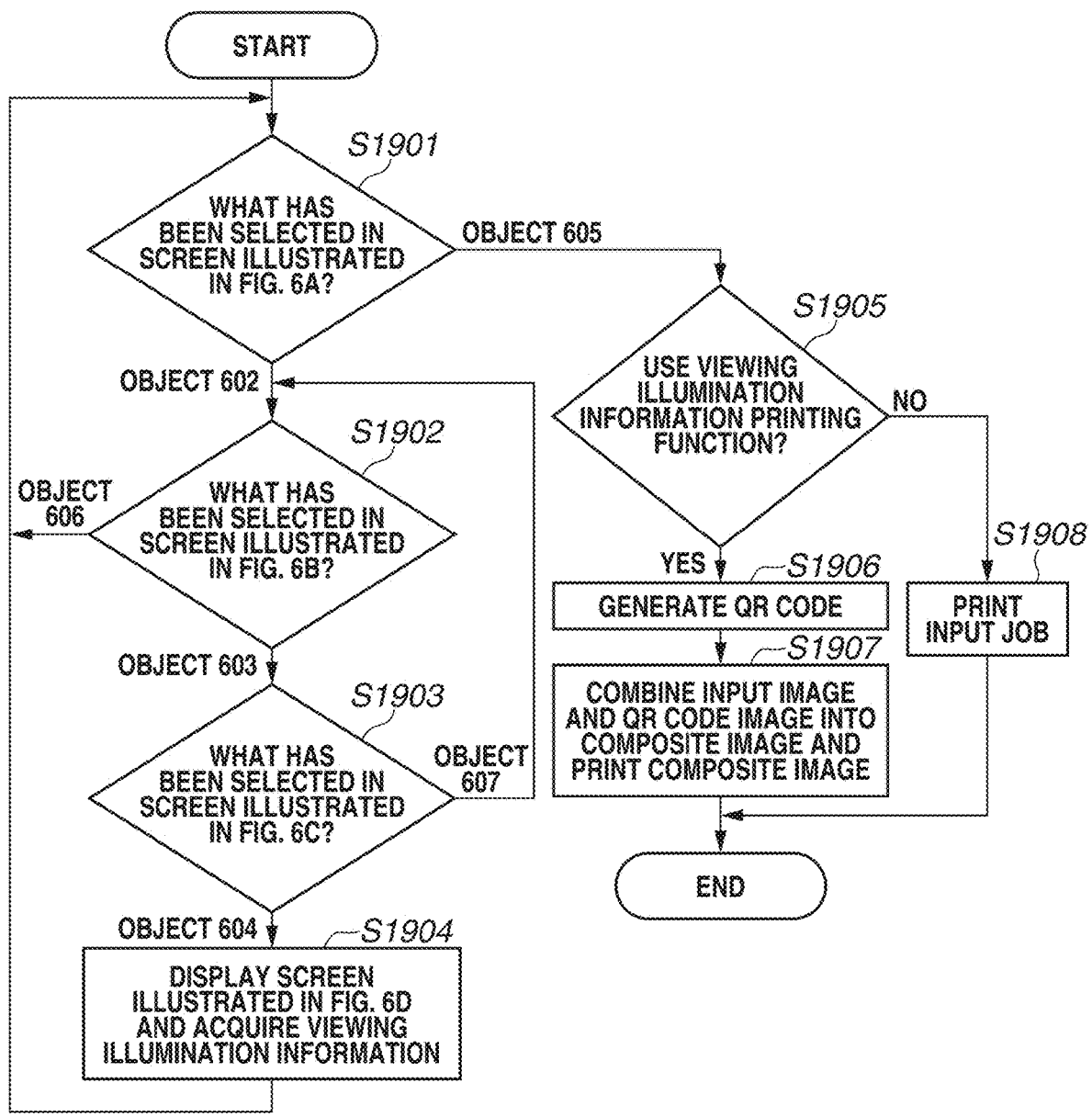
FIG. 11 is a flowchart illustrating an example of screen control according to the first exemplary embodiment.

FIG. 11 is a flowchart of screen control in the first exemplary embodiment.

The present processing flow is implemented by the CPU 101 loading a program for performing this processing flow from the ROM 102 onto the RAM 103 and executing respective module units of the program.

In step S1901, the display unit 105 displays a screen illustrated in FIG. 6A and the operation unit 106 determines which of the object 602 and the object 605 has been selected. In a case where the object 602 has been selected, the processing transitions to processing for selecting print setting. In a case where the object 605 has been selected, the processing transitions to print execution processing. If it is determined that the object 602 has been selected (OBJECT 602 in step S1901), the CPU 101 advances the processing to step S1902, and, if it is determined that the object 605 has been selected (OBJECT 605 in step S1901), the CPU 101 advances the processing to step S1905.

In step S1902, the display unit 105 displays a print setting change screen illustrated in FIG. 6B and the operation unit 106 receives whether to perform changing of print setting. In a case where the object 603 has been selected, the processing transitions to processing for changing a setting as to whether to use a printing function for viewing illumination information. In a case where the object 606 has been selected, the CPU 101 determines that change of setting has ended and the screen returns to the screen illustrated in FIG. 6A.

If it is determined that the object 603 has been selected (OBJECT 603 in step S1902), the CPU 101 advances the processing to step S1903. If it is determined that the object 606 has been selected (OBJECT 606 in step S1902), the CPU 101 returns the processing to step S1901.

In step S1903, the display unit 105 displays a screen illustrated in FIG. 6C and the CPU 101 determines whether to use a viewing illumination information printing function. In a case where the object 604 has been selected, the CPU 101 determines to use the viewing illumination information printing function. In a case where the object 607 has been selected, the CPU 101 determines not to use the viewing illumination information printing function. If it is determined that the object 604 has been selected (OBJECT 604 in step S1903), the CPU 101 advances the processing to step S1904 to acquire viewing illumination information. If it is determined that the object 607 has been selected (OBJECT 607 in step S1903), the CPU 101 returns the processing to step S1902 to display the screen illustrated in FIG. 6B.

In step S1904, the display unit 105 displays a screen illustrated in FIG. 6D and the operation unit 106 receives inputting of viewing illumination information. Then, upon completion of the inputting, the CPU 101 returns the processing to step S1901.

In step S1905, the CPU 101 determines whether use of the viewing illumination information printing function is currently selected. In a case where the object 604 has been selected in step S1903 and the viewing illumination information has been correctly acquired in step S1904, the CPU 101 determines that use of the viewing illumination information printing function is currently selected (YES in step S1905), the CPU 101 advances the processing to step S1906.

In a case where the object 607 has been selected in step S1903, the CPU 101 determines that use of the viewing illumination information printing function is not currently selected (NO in step S1905), the CPU 101 advances the processing to step S1908.

In step S1906, the CPU 101 generates a two-dimensional barcode from the acquired viewing illumination information and then advances the processing to step S1907.

In step S1907, the CPU 101 combines an input image and the generated two-dimensional barcode and performs a printing operation. In step S1908, the CPU 101 prints an input image.

<Screen Control by Smartphone 730>

Figure 12:
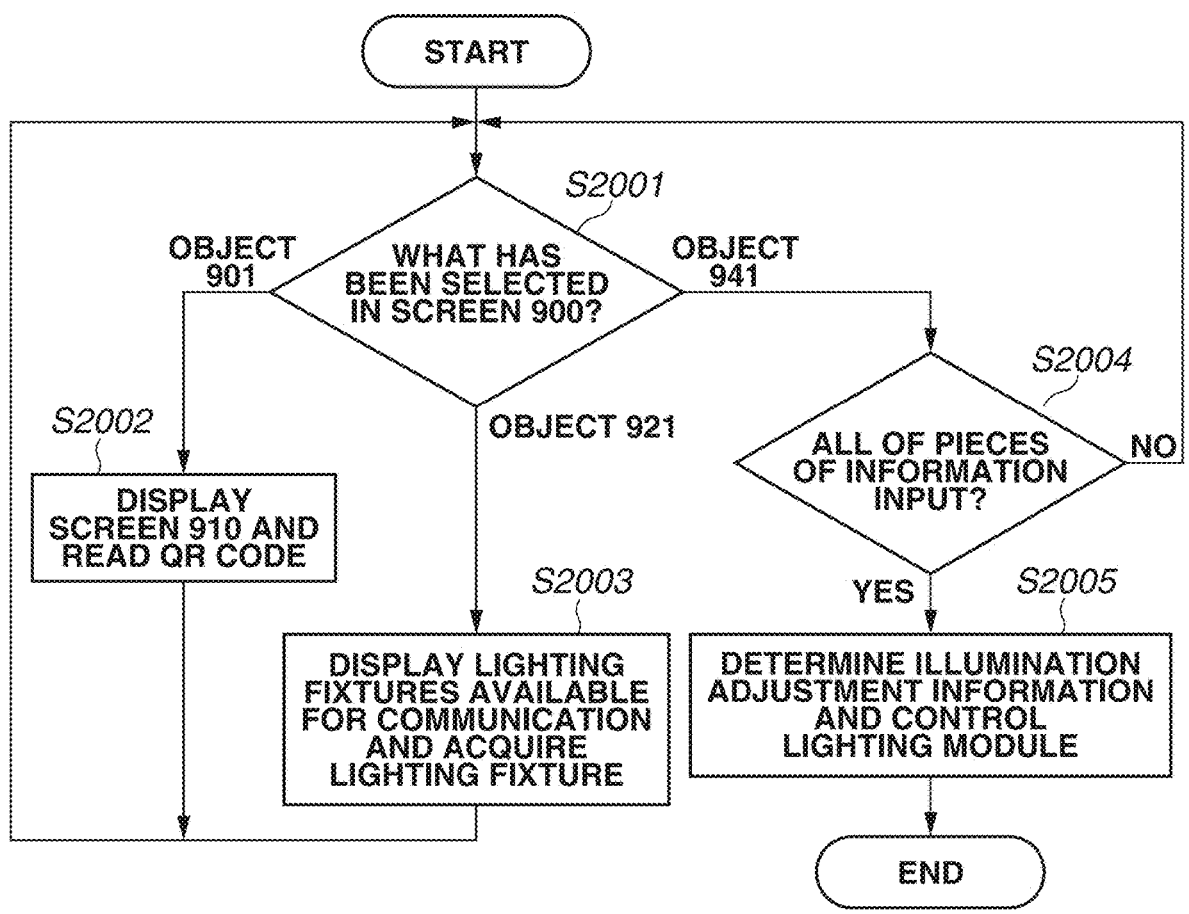
FIG. 12 is a flowchart illustrating an example of screen control according to the first exemplary embodiment.

FIG. 12 is a flowchart of screen control by the smartphone 730 in the first exemplary embodiment.

The present processing flow is implemented by a CPU (not illustrated) included in the system control unit 735 loading a program for performing this processing flow from a ROM (not illustrated) included in the system control unit 735 onto a RAM (not illustrated) included in the system control unit 735 and executing respective module units of the program.

In step S2001, the display unit 736 displays a screen 900 illustrated in FIG. 9 and the operation unit 738 determines which of the object 901, the object 921, and the object 941 has been selected. If it is determined that the object 901 has been selected (OBJECT 901 in step S2001), the CPU included in the system control unit 735 advances the processing to step S2002 to proceed to viewing illumination information acquisition processing for acquiring viewing illumination information.

If it is determined that the object 921 has been selected (OBJECT 921 in step S2001), the system control unit 735 advances the processing to step S2003 for the smartphone 730 to search for lighting fixtures present within a range available for communication and select an illumination lamp targeted for control. If it is determined that the object 941 has been selected (OBJECT 941 in step S2001), the system control unit 735 advances the processing to step S2004 to control the selected illumination lamp.

In step S2002, the display unit 736 displays a screen 910 illustrated in FIG. 9 and the smartphone 730 reads a two-dimensional barcode to acquire viewing illumination information.

In step S2003, the display unit 736 displays a screen 930 illustrated in FIG. 9 and the smartphone 730 searches for lighting fixtures available for communication and displays a list of the found lighting fixtures on the screen 930. Then, in response to an illumination lamp targeted for control being selected by the viewing person 777, the system control unit 735 acquires illumination information about the selected lighting fixture. The illumination adjustment information represents a range of controllable correlated color temperature and luminous flux of a lighting module.

In step S2004, the system control unit 735 determines whether viewing illumination information and illumination information have already been acquired. If it is determined that viewing illumination information and illumination information have already been acquired (YES in step S2004), the system control unit 735 advances the processing to step S2005 to control the lighting module 760. If it is determined that there is information which has not been acquired (NO in step S2004), the system control unit 735 returns the processing to step S2001 to acquire such information.

In step S2005, the system control unit 735 determines illumination adjustment information from the viewing illumination information and the illumination information, and controls the lighting module 760 based on the illumination adjustment information.

As described above, according to the first exemplary embodiment, printing viewing illumination information, reading the printed viewing illumination information, determining illumination adjustment information from the viewing illumination information and illumination information about an illumination lamp, and controlling the illumination lamp based on the illumination adjustment information enables a printed product to be viewed in an original color tone. This enables performing environmental light correction corresponding to an optional observation light source without putting a load on the viewing person 777.

Furthermore, the first exemplary embodiment is not limited to using the smartphone 730, and, naturally, for example, a network camera or a tablet device can be used.

Figure 13:
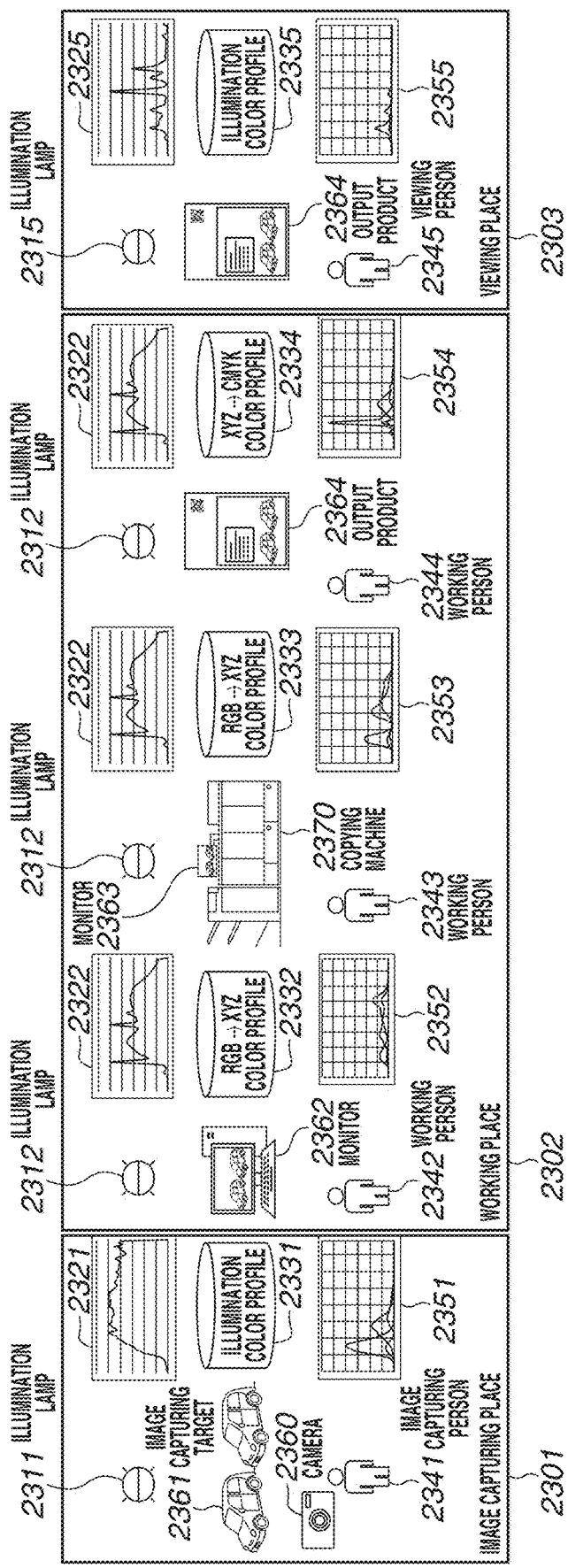
FIG. 13 is a diagram illustrating relationships between light and appearance.

Illumination and appearance of color in the first exemplary embodiment are described with reference to FIG. 13. FIG. 13 illustrates an environment including an image capturing place 2301, a working place 2302, and a viewing place 2303.

The image capturing place 2301 includes an illumination lamp 2311, an image capturing target 2361, and a camera 2360. The image capturing place 2301 is a place at which an image capturing person 2341 performs image capturing of the image capturing target 2361 illuminated by the illumination lamp 2311 with use of the camera 2360. The illumination lamp 2311 has, for example, a spectral characteristic 2321. The illumination lamp 2311 also has a color profile 2331. A characteristic 2351 of appearance of a given color which has been viewed by the image capturing person 2341 is also illustrated. In the first exemplary embodiment, the characteristic 2351 is a characteristic obtained when the image capturing person 2341 has viewed a red car body.

The working place 2302 includes an illumination lamp 2312, a monitor 2362, a copying machine 2370, a monitor 2363, and an output product 2364. The monitor 2362 is an apparatus which receives an image captured by the camera 2360 and displays the received image.

The illumination lamp 2312 has, for example, a spectral characteristic 2322. A color profile 2332 is used when the monitor 2362 displays an image. A characteristic 2352 of appearance of a given color which has been viewed by a working person 2342 on the monitor 2362 is also illustrated. In the first exemplary embodiment, the characteristic 2352 is a characteristic obtained when the working person 2342 has viewed a red car body, and the color which has been viewed by the working person 2342 is the same as the color viewed by the image capturing person 2341. The characteristics 2351 and 2352 differing from each other means that, although the same color is viewed, a color which is seen by the image capturing person 2341 and a color which is seen by the working person 2342 differ from each other. This is because spectral characteristics 2321 and 2322 of illumination lamps differ from each other.

In the working place 2302, the copying machine 2370 is used to print an image captured by the camera 2360, and the copying machine 2370 is able to perform preview display of the captured image with use of the monitor 2363, which is mounted on the copying machine 2370. The monitor 2363, which is mounted on the copying machine 2370, provides preview display of the captured image. A characteristic 2353 of appearance of a given color which has been viewed by a working person 2343 on the monitor 2363 is also illustrated. In the first exemplary embodiment, the characteristic 2353 is a characteristic obtained when the working person 2343 has viewed a red car body.

The output product 2364 is a product obtained by the copying machine 2370 printing an image captured by the camera 2360. A characteristic 2354 of appearance of a given color of the output product 2364 which has been viewed by a working person 2344 is also illustrated. A color profile 2334 has been used by the copying machine 2370 producing the output product 2364.

The viewing place 2303 is a place at which the output product 2364 is viewed. The viewing place 2303 includes an illumination lamp 2315 and the output product 2364. The illumination lamp 2315 has a spectral characteristic 2325. The illumination lamp 2315 also has a color profile 2335.

A characteristic 2355 of appearance of a given color of the output product 2364 which has been viewed by a viewing person 2345 is also illustrated. In the first exemplary embodiment, a method of controlling the illumination lamp 2315 in such a way as to bring the spectral characteristic 2325 of the illumination lamp 2315 close to the spectral characteristic 2322 of the illumination lamp 2312 has been described.

Bringing the spectral characteristic 2325 of the illumination lamp 2315 close to the spectral characteristic 2322 of the illumination lamp 2312 enables bring the characteristic 2355 of appearance of a given color of the output product 2364 which has been viewed by the viewing person 2345 close to the characteristic 2354 of appearance. This enables providing the same color tone as that of the output product 2364, the color tone of which has been adjusted under the illumination lamp 2312 by the working person 2344 in the working place 2302, to the viewing person 2345 even in the viewing place 2303.

In the above-described first exemplary embodiment, viewing illumination information is configured to be manually input by the working person 333.

In a second exemplary embodiment, a case where illumination lamps connected to a network are searched for and are displayed in a list and an illumination lamp is selected from the list by a working person 1111 is described.

Unless otherwise stated, the second exemplary embodiment is similar to the first exemplary embodiment, and the same constituent elements as those in the first exemplary embodiment are assigned the respective same reference characters and the detailed description thereof is omitted.

Furthermore, in the following description, only differences from the first exemplary embodiment are described in detail.

<Description of Working Place 1101>

Figure 14:
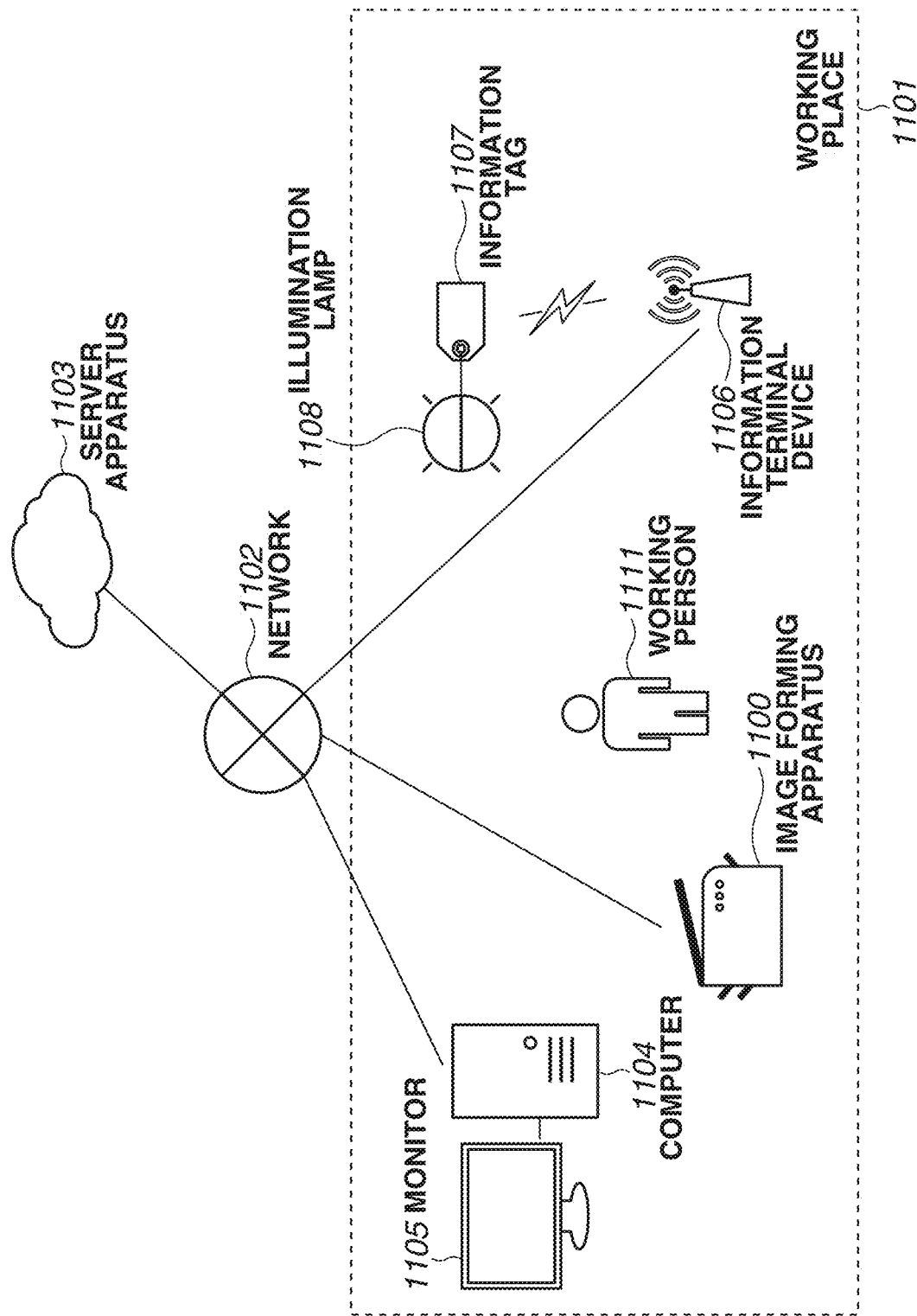
FIG. 14 is a block diagram illustrating an overall configuration of a working place according to a second exemplary embodiment.

FIG. 14 is a conceptual diagram illustrating an overall configuration of a working place 1101 according to the second exemplary embodiment, and illustrates the working place 1101, a network 1102, and a server apparatus 1103. Moreover, the working place 1101 in the second exemplary embodiment includes an image forming apparatus 1100, a monitor 1105, a computer 1104, an illumination lamp 1108, an information terminal device 1106, and an information tag 1107. More specifically with regard to the above-mentioned configuration, the working place 1101 is a place at which the working person 1111 performs a printing operation with use of the image forming apparatus 1100.

Next, in the working place 1101, the information terminal device 1106 is a device which transmits and receives information to and from the image forming apparatus 1100 in a wired or wireless manner via the network 1102. The communication standard (method) is, for example, Wi-Fi® communication, infrared communication, visible light communication, or proximal wireless communication (for example, Near Field Communication (NFC)).

As the proximal wireless communication, for example, Felica®, Bluetooth®, or radio frequency identifier (RFID) is used. In the second exemplary embodiment, a case where RFID is used is described. RFID is a system in which an "RFID tag" with electronic information (information about, for example, name, price, and manufacturing date) input thereto is attached to, for example, a commercial product or food product and the electronic information is read by a "reader and writer", which is a read and write device. In the second exemplary embodiment, the information terminal device 1106 means an RFID reader and writer.

The information tag 1107 means an RFID tag. The RFID tag is a storage medium with a memory built therein, and is allowed to input electronic information thereinto, erase electronic information therefrom, and rewrite electronic information. These processing operations are performed with use of radio waves (a type of electromagnetic radiation). The RFID tag may be called an integrated circuit (IC) tag.

The server apparatus 1103 is, for example, cloud computing and is an apparatus which provides a service for, for example, a computer resource or data via a network such as the Internet. In the second exemplary embodiment, pieces of spectral data about a variety of illumination lamps and characteristic data related thereto (correlated color temperature, general color rendering index, and luminous flux) are assumed to be stored in the server apparatus 1103 in advance.

The correlated color temperature is a scale which expresses the color of light by a quantitative numerical value (kelvin (K)), in which, when the color temperature is low, the color of light is dark orange and, as the color temperature becomes higher, the color of light comes closer to bluish white. The general color rendering index is an index obtained by expressing a characteristic affecting the appearance of color of an object when the object is illuminated with light as a quantitative numerical value (Ra), in which, generally based on natural light, the light being closer to natural light is determined to be "good" or "excellent" and the light being away from natural light is determined to be "bad" or "inferior". The luminous flux is a physical quantity (lumen (lm)) which represents the brightness of light passing through a given plane. The server apparatus 1103 is supposed to be an apparatus which various lighting fixture manufacturers installed to enable pieces of spectral data about illumination lamps to be utilized between different industries, and stores pieces of spectral data associated with model numbers of the respective illumination lamps.

<Flowchart of Viewing Illumination Information Print Processing>

Details of print processing of viewing illumination information are described with reference to FIG. 15 and FIGS. 16A, 16B, 16C, and 16D.

Figure 15:
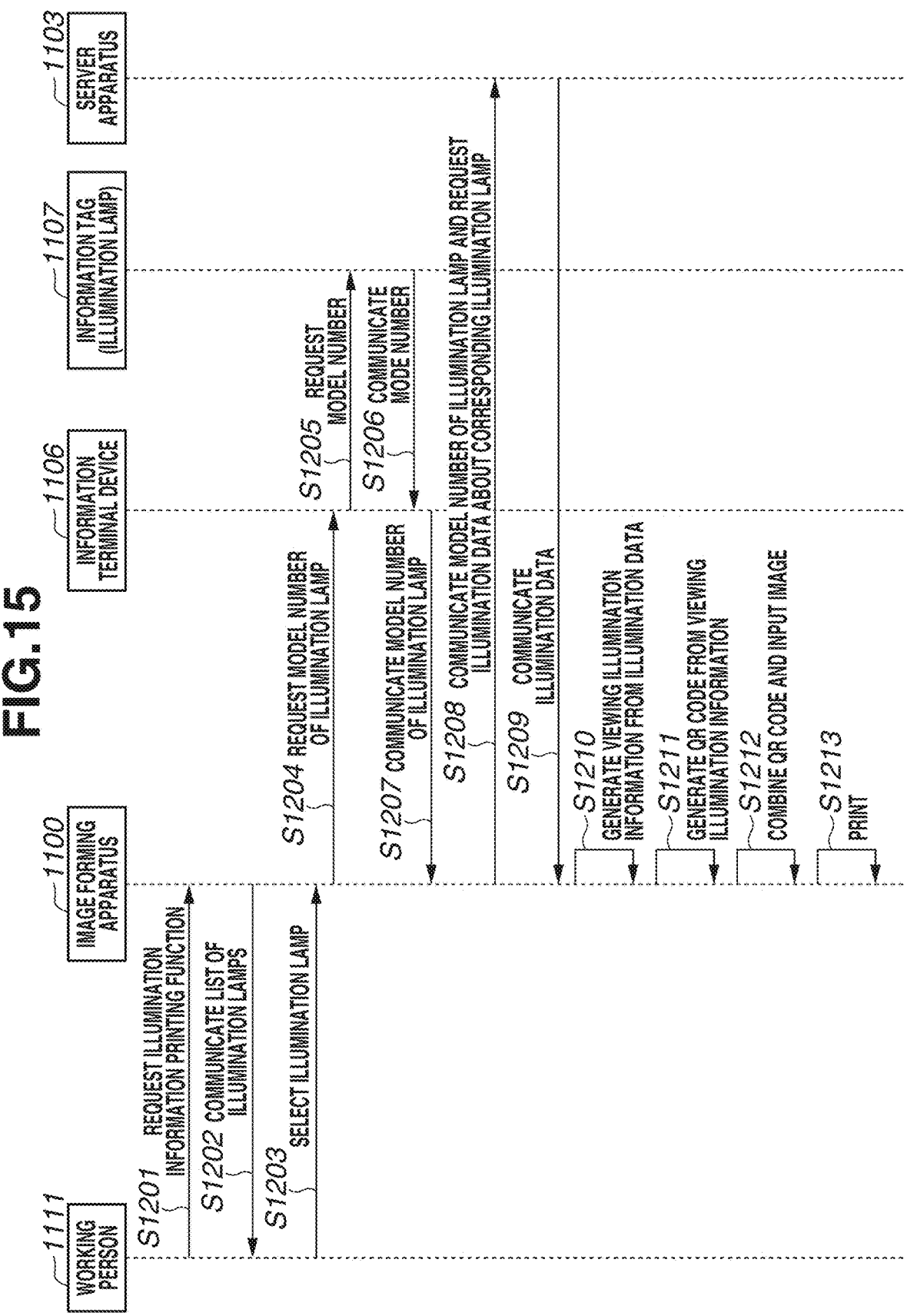
FIG. 15 is a sequence diagram illustrating print processing for viewing illumination information in the second exemplary embodiment.

FIG. 15 is a sequence diagram illustrating viewing illumination information print processing in the second exemplary embodiment.

The present processing flow is implemented by the CPU 101 loading a program for performing this processing flow from the ROM 102 onto the RAM 103 and executing respective module units of the program.

In step S1201, the display unit 105 displays a screen illustrated in FIG. 16A and the operation unit 106 receives selection of an object 1301 from the working person 1111. This results in that a job "catalog.pdf" has been selected as an input job. The job "catalog.pdf" is a job previously transmitted from the computer 1104 to the image forming apparatus 1100.

Next, the display unit 105 displays the screen illustrated in FIG. 16A and the operation unit 106 receives selection of an object 1302 from the working person 1111. Next, the display unit 105 displays a screen illustrated in FIG. 16B and the operation unit 106 receives selection of an object 1303 from the working person 1111. Then, the display unit 105 displays a screen illustrated in FIG. 16C, and the operation unit 106 receives selection of an object 1304 from the working person 1111.

In step S1202, the display unit 105 displays a screen illustrated in FIG. 16D. In step S1203, the operation unit 106 receives selection of a target illumination lamp out of a list of illumination lamps from the working person 1111. Specifically, the operation unit 106 receives selection of an object 1308 from the working person 1111.

In step S1204, the CPU 101 communicates information about the illumination lamp selected in step S1203 to the information terminal device 1106 and requests data stored in the information tag 1107 from the information terminal device 1106.

In step S1205, the information terminal device 1106 requests data stored in the information tag 1107 with use of wireless communication for a short range (several centimeters (cm) to several meters (m)) using an electromagnetic field or electric field.

In step S1206, in a case where the information tag 1107 is of the "passive type" with no battery built therein, the information tag 1107 uses radio waves emitted from the information terminal device 1106 as a power source and converts data stored in the memory into an electronic signal and reflects (transmits) the electronic signal. The information terminal device 1106 receives the electronic signal, so that reading (scanning) is completed. Moreover, in a case where the information tag 1107 is of the "active type" with a battery built therein, the information terminal device 1106 reads data by receiving radio waves emitted from the information tag 1107.

In step S1207, the information terminal device 1106 transmits the data received from the information tag 1107 to the CPU 101.

In step S1208, the CPU 101 connects to the server apparatus 1103 via the network I/F 109 and the network 1102, and communicates the model number of the illumination lamp 1108 to the server apparatus 1103 and requests viewing illumination information about the corresponding illumination lamp. The viewing illumination information is composed of correlated color temperature and luminous flux.

In step S1209, the server apparatus 1103 transmits illumination data corresponding to the model number of the illumination lamp 1108 to the CPU 101.

In step S1210, the CPU 101 generates viewing illumination information from the illumination data.

For example, a case where the correlated color temperature of the illumination data is 5000 (K) and the luminous flux thereof is 600 (lm) is described.

The illuminance from a given light source is able to be obtained from the following equation (4), which is obtained by expanding equation (1) mentioned in the first exemplary embodiment. However, in the second exemplary embodiment, a case where 30% of the luminous flux directly falls on the floor surface is described. The illuminance varies in numerical value depending on the height of the light source from the floor.

$$\text{Illuminance (lx)} = 600 \times 0.3/10 = 18 \text{ (lx)} \tag{4}$$

Accordingly, the illuminance of the illumination lamp 1108 can be calculated to be 18 (lx).

In step S1211, the CPU 101 encodes the viewing illumination information acquired in step S1210 to generate a two-dimensional barcode.

In step S1212, the CPU 101 combines the generated two-dimensional barcode and an image included in the job selected in step S1201 into a composite image.

In step S1213, the CPU 101 performs a printing operation of the composite image.

<Screen Control by Display Unit 105>

Figure 17:
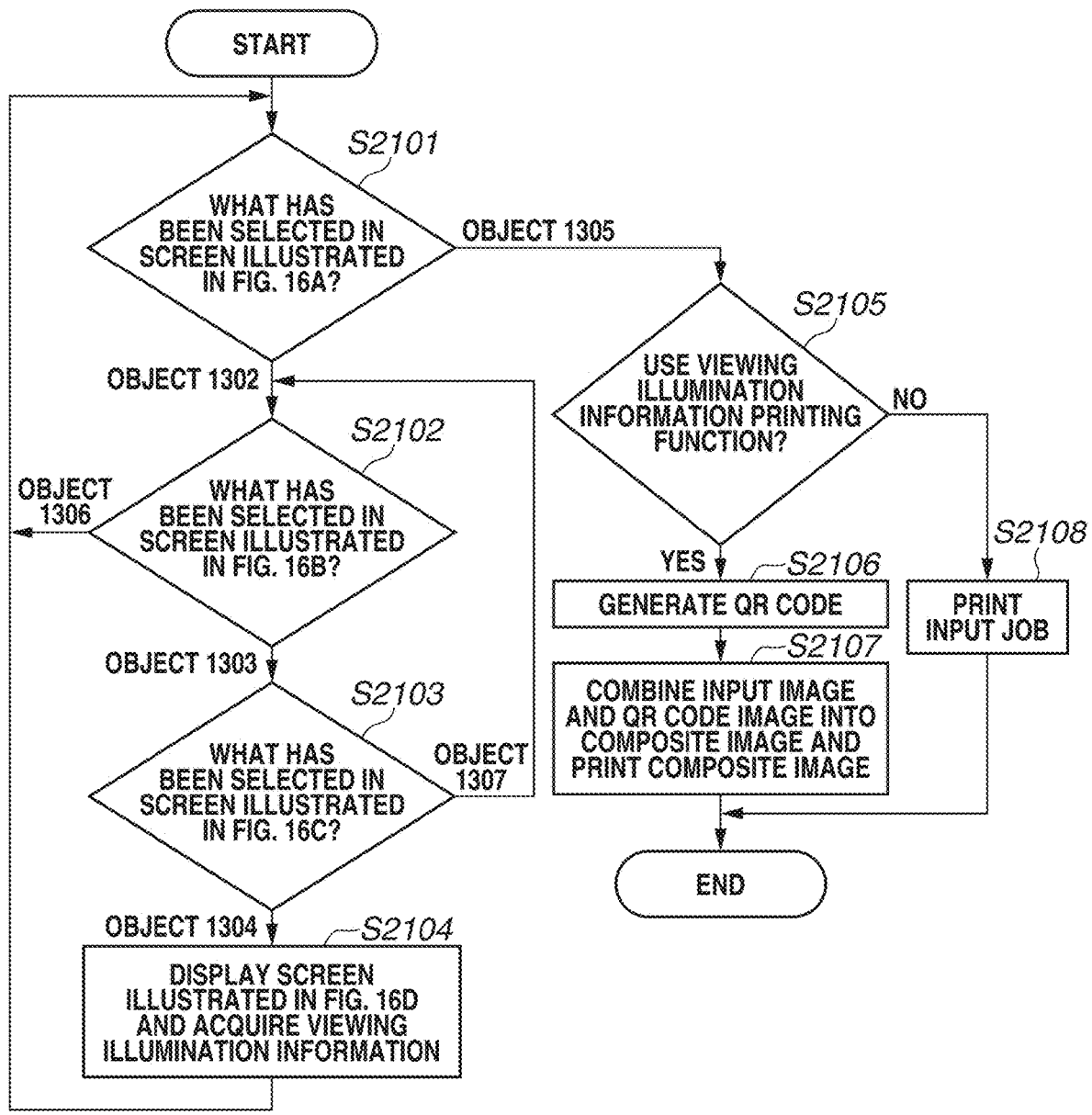
FIG. 17 is a flowchart illustrating an example of screen control according to the second exemplary embodiment.

FIG. 17 is a flowchart of screen control in the second exemplary embodiment.

The present processing flow is implemented by the CPU 101 loading a program for performing this processing flow from the ROM 102 onto the RAM 103 and executing respective module units of the program.

Steps other than step S2104 are the same as those in the first exemplary embodiment. Accordingly, only step S2104 is described.

In step S2104, the display unit 105 displays a screen illustrated in FIG. 16D and the operation unit 106 searches for illumination lamps available for communication, and creates and displays a list of the found illumination lamps. Then, the CPU 101 acquires viewing illumination information about the selected illumination lamp.

As described above, according to the second exemplary embodiment, since, at the time of acquisition of viewing illumination information, illumination data is acquired from the server apparatus 1103, a special tool such as a color illuminance meter is not required, so that the convenience of a viewing person is improved.

While, in the second exemplary embodiment, an illumination lamp is selected by the working person 1111, illumination data about an illumination lamp closest to the image forming apparatus can be acquired and printed.

In the above-described first exemplary embodiment, a case where a two-dimensional barcode with viewing illumination information embedded therein is printed on a printed product has been described.

In a third exemplary embodiment, the case of, when a printed product is previewed on the display unit 105 of the image forming apparatus, to check a color tone, conforming environmental light in a place at which to view the printed product and environmental light in a place at which to view the previewed image to each other is described. This enables simply checking the color tone by preview without performing printing.

Unless otherwise stated, the third exemplary embodiment is similar to the first exemplary embodiment, and the same constituent elements as those in the first exemplary embodiment are assigned the respective same reference characters and the detailed description thereof is omitted.

Furthermore, in the following description, only differences from the first exemplary embodiment are described in detail.

<Network System Configuration>

Figure 18:
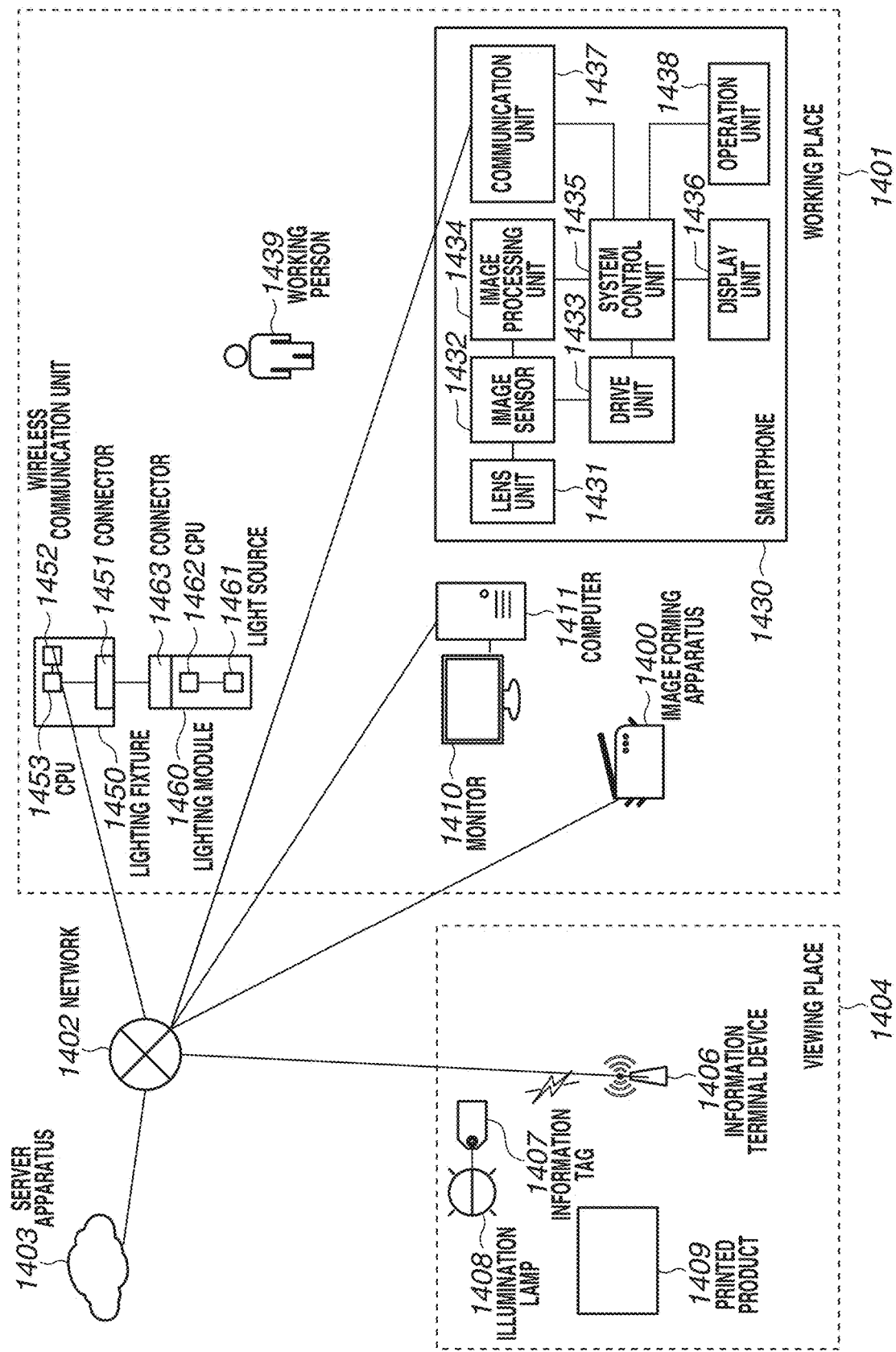
FIG. 18 is a block diagram illustrating an overall configuration of a network system according to a third exemplary embodiment.

FIG. 18 is a conceptual diagram illustrating an overall configuration of a network system according to the third exemplary embodiment. The network system includes a working place 1401, a network 1402, a server apparatus 1403, and a viewing place 1404.

The network 1402 has the same configuration as that of the network 302. The server apparatus 1403 has the same configuration as that of the server apparatus 1103. The working place 1401 includes an image forming apparatus 1400, a monitor 1410, a computer 1411, a smartphone 1430, a lighting fixture 1450, and a lighting module 1460. The image forming apparatus 1400 has the same configuration as that of the image forming apparatus 300. The monitor 1410 has the same configuration as that of the monitor 310. The computer 1411 has the same configuration as that of the computer 311. The smartphone 1430 has the same configuration as that of the smartphone 730. The lighting fixture 1450 has the same configuration as that of the lighting fixture 750. The lighting module 1460 has the same configuration as that of the lighting module 760.

The viewing place 1404 includes an information terminal device 1406, an information tag 1407, an illumination lamp 1408, and a printed product 1409. The information terminal device 1406 has the same configuration as that of the information terminal device 1106. The information tag 1407 has the same configuration as that of the information tag 1107. The illumination lamp 1408 has the same configuration as that of the illumination lamp 1108. The printed product 1409 has the same configuration as that of the printed product 720.

A block diagram illustrating a configuration of the image forming apparatus 1400 according to the third exemplary embodiment is similar to that in the first exemplary embodiment, and is, therefore, omitted from description. A block diagram illustrating configurations of the CPU 101 and the image processing unit 110 is similar to that in the first exemplary embodiment, and is, therefore, omitted from description.

<Flowchart of Viewing Illumination Information Display Processing>

Details of display processing of viewing illumination information are described with reference to FIGS. 19A, 19B, 19C, 19D, and 19E and FIG. 20. FIGS. 19A to 19E are diagrams illustrating examples of screens each of which is displayed on the display unit 105 in the third exemplary embodiment.

FIG. 20 is a sequence diagram illustrating display processing of viewing illumination information in the third exemplary embodiment. The present processing flow is implemented by the CPU 101 loading a program for performing this processing flow from the ROM 102 onto the RAM 103 and executing respective module units of the program.

In step S1601, the display unit 105 display a screen illustrated in FIG. 19A and the operation unit 106 receives selection of an object 1501 from a working person 1439. This results in that a job "catalog.pdf" has been selected as an input job. The job "catalog.pdf" is a job previously transmitted from the computer 1411 to the image forming apparatus 1400.

In step S1602, the display unit 105 displays the screen illustrated in FIG. 19A and the operation unit 106 receives selection of an object 1502 from the working person 1439.

Next, the display unit 105 displays a screen illustrated in FIG. 19B and the operation unit 106 receives selection of an object 1503 from the working person 1439. Then, the display unit 105 displays a screen illustrated in FIG. 19C, and the operation unit 106 receives selection of an object 1504 from the working person 1439.

Figure 19D:
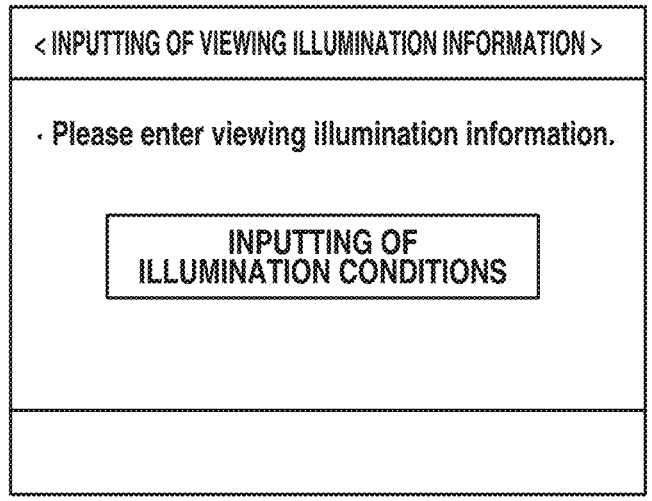

In step S1603, the display unit 105 displays a screen illustrated in FIG. 19D and the CPU 101 has viewing illumination information manually input from the working person 1439. The working person 1439 measures viewing illumination information in the viewing place 1404 with a color illuminance meter (not illustrated) and thus inputs correlated color temperature "5000 (K)" and illuminance "30 (lx)". While, in the third exemplary embodiment, a color illuminance meter is used, the CPU 101 can be configured to acquire viewing illumination information about the illumination lamp 1408 from the information tag 1407 with use of the information terminal device 1406.

In step S1604, the CPU 101 encodes the viewing illumination information acquired in step S1603 to generate a two-dimensional barcode. In step S1605, the CPU 101 combines the generated two-dimensional barcode and an image included in the job selected in step S1601 into a composite image.

In step S1606, the display unit 105 display the screen illustrated in FIG. 19A and the operation unit 106 receives selection of an object 1510 from the working person 1439.

Figure 19E:
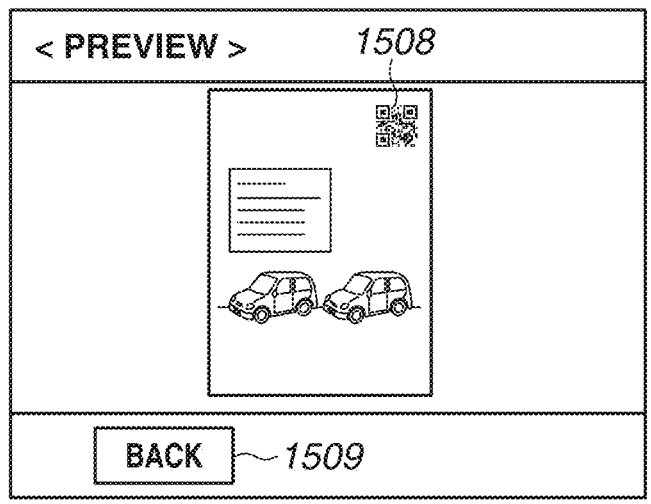

In step S1607, the display unit 105 display a screen illustrated in FIG. 19E to perform preview display.

In step S1608, the working person 1439 launches an application of the smartphone 1430 and performs an operation.

In step S1609, the smartphone 1430 displays a screen 900 illustrated in FIG. 9. The screen 900 is a main screen for an application for performing adjustment processing of viewing environmental illumination. An operation of registering viewing illumination information and illumination information and pressing a "start" object for illumination adjustment enables adjusting the selected illumination lamp. In response to the working person 1439 performing a touch operation on the object 901, the display unit 1436 displays a screen 910.

The screen 910 is a screen for use in performing image capturing of a two-dimensional barcode with use of the smartphone 1430.

In the third exemplary embodiment, the smartphone 1430 performs image capturing of a two-dimensional barcode 1508 illustrated in FIG. 19E.

An image capturing area screen 911 is a region which displays an image which is being captured by the smartphone 1430. A guide frame indicating a position to which to fit a two-dimensional barcode is displayed in the image capturing area screen 911. Upon succeeding in reading of the two-dimensional barcode, the smartphone 1430 ends reading processing of the two-dimensional barcode.

In step S1610, the system control unit 1435 analyzes information read from the two-dimensional barcode. As a result of analysis, the system control unit 1435 acquires, as viewing illumination information, correlated color temperature "5000 (K)" and illuminance "30 (lx)".

The system control unit 1435 detects a two-dimensional barcode from image data acquired by scanning. While, here, a case where a two-dimensional barcode, which is a typical two-dimensional code, is used as a code image to be appended to an original is described as an example, the code image is not limited to the two-dimensional barcode. For example, the code image can be a one-dimensional code or an image obtained by coding specific information intended for, for example, document management or copying limitation, such as a digital watermark.

The system control unit 1435 analyzes the two-dimensional barcode to acquire viewing illumination information and thus completes registration of the viewing illumination information.

In step S1611, the smartphone 1430 displays a screen 920 illustrated in FIG. 9. The screen 920 is a main screen. In response to the working person 1439 performing a touch operation on an object 921, the display unit 1436 displays a screen 930. The screen 930 displays a list of lighting fixtures, which are capable of communicating with the smartphone 1430, present near the smartphone 1430.

In response to the working person 1439 performing a touch operation on an object 931, the smartphone 1430 connects to the lighting fixture 1450 via the communication unit 1437 and the network 1402, and requests illumination information about the lighting module 1460.

In step S1612, the lighting fixture 1450 communicates illumination information about the lighting module 1460 to the smartphone 1430. The illumination information is information composed of correlated color temperature and luminous flux. The correlated color temperature of the lighting module 1460 is, for example, 2200 (K) or more and 6500 (K) or less. The luminous flux of the lighting module 1460 is, for example, 0 (lm) or more and 800 (lm) or less.

In step S1613, the smartphone 1430 determines illumination adjustment information from the acquired viewing illumination information and the acquired illumination information. The illumination adjustment information is composed of correlated color temperature and light quantity. For example, the light quantity can be represented by a numerical value in the range of 0% to 100%.

In the third exemplary embodiment, the viewing illumination information includes correlated color temperature "5000 (K)" and illuminance "30 (lx)". Moreover, the correlated color temperature of the illumination information is 2200 (K) or more and 6500 (K) or less. The luminous flux thereof is 0 (lm) or more and 800 (lm) or less.

The system control unit 1435 determines the luminous flux of the lighting module 1460 from the illuminance of the viewing illumination information. The illuminance from a given light source is able to be obtained from equation (1) mentioned in the first exemplary embodiment. For example, a luminous flux directly falling on the floor is assumed to be 30% of the entire emitted light flux and the floor area of the working place 1401 is assumed to be 10 (m$^2$).

Since the illuminance of the viewing illumination information is 30 (lx), assigning such conditions to equation (1) enables calculating the required luminous flux as shown in equations (5) and (6).

$$30 \text{ (lx)} = \text{luminous flux} \times 30(\%)/10 \text{ (m}^2\text{)} \quad (5)$$

$$\text{Luminous flux (lm)} = 30 \text{ (lx)} \times 10 \text{ (m}^2\text{)}/30(\%) = 1000 \text{ (lm)} \quad (6)$$

Accordingly, the required luminous flux is able to be determined to be 1000 (lm) from the viewing illumination information.

The above-mentioned calculation method for luminous flux is merely an example, and the floor area and the distance from a viewing object to a light source vary depending on viewing conditions.

The viewing illumination information includes correlated color temperature "5000 (K)" and required luminous flux "1000 (lm)". Moreover, the correlated color temperature of the illumination information is 2200 (K) or more and 6500 (K) or less. The luminous flux thereof is 0 (lm) or more and 800 (lm) or less.

Accordingly, since the viewing illumination information is outside the range of the illumination information, the system control unit 1435 determines illumination adjustment information in step S1003. Since the correlated color temperature is within the range of the illumination information, the system control unit 1435 determines that the correlated color temperature of the illumination adjustment information is 5000 (K). Next, since the required luminous flux is 1000 (lm) and is, therefore, outside the range of the illumination information, the system control unit 1435 determines 800 (lm), which is the closest value, as a luminous flux of the illumination adjustment information.

Here, the description refers back to adjustment processing of viewing environmental illumination.

In step S1614, the smartphone 1430 transmits the illumination adjustment information to the lighting fixture 1450.

In step S1615, the lighting fixture 1450 transmits the illumination adjustment information to the lighting module 1460.

In step S1616, the lighting module 1460 controls the light source 1461 based on the received illumination adjustment information.

<Screen Control By Display Unit 105>

Figure 21:
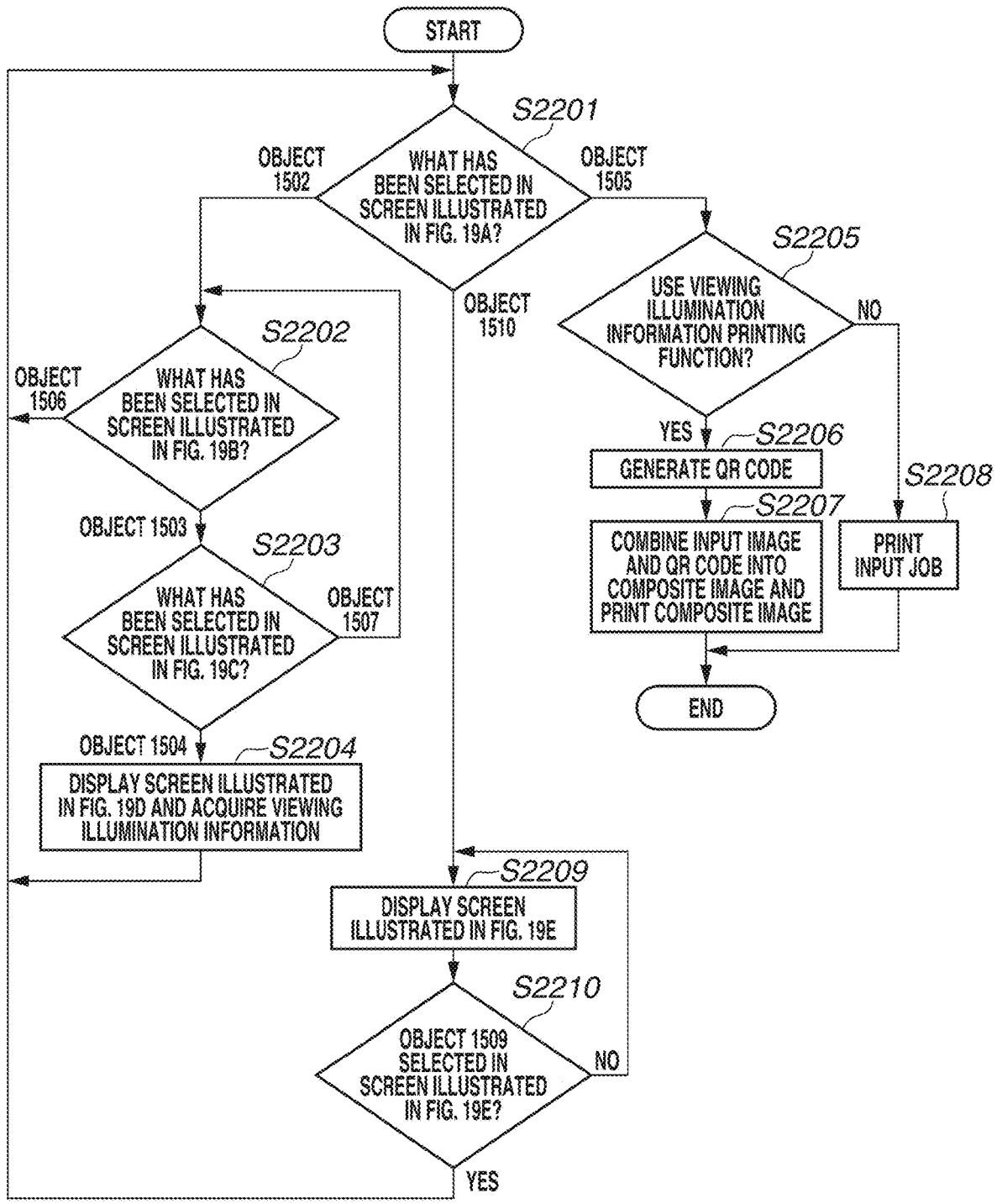
FIG. 21 is a flowchart illustrating an example of screen control according to the third exemplary embodiment.

FIG. 21 is a flowchart of screen control in the third exemplary embodiment. The present processing flow is implemented by the CPU 101 loading a program for performing this processing flow from the ROM 102 onto the RAM 103 and executing respective module units of the program.

Steps illustrated in FIG. 21 are the same as those in the first exemplary embodiment except for steps S2201, S2209, and S2210. Accordingly, only steps S2201, S2209, and S2210 are described.

In step S2201, the display unit 105 displays a screen illustrated in FIG. 19A and the operation unit 106 determines which of the object 1502, the object 1505, and the object 1510 has been selected. In a case where the object 1502 has been selected, the processing transitions to processing for selecting print setting.

In a case where the object 1505 has been selected, the processing transitions to print execution processing. In a case where the object 1510 has been selected, the processing transitions to step S2209 to perform a preview function. If it is determined that the object 1502 has been selected (OBJECT 1502 in step S2201), the CPU 101 advances the processing to step S2202, and, if it is determined that the object 1505 has been selected (OBJECT 1505 in step S2201), the CPU 101 advances the processing to step S2205.

In step S2209, the display unit 105 displays a screen illustrated in FIG. 19E. The CPU 101 generates a two-dimensional barcode from the acquired viewing illumination information, combines the two-dimensional barcode and an input image into a composite image, and displays the composite image on the display unit 105. In a case where viewing illumination information is not acquired or in a case where a viewing illumination information printing function is not selected, the CPU 101 directly performs preview display of an input image without performing combining processing.

In step S2210, the CPU 101 determines whether an object 1509 has been selected. If it is determined that the object 1509 has been selected (YES in step S2210), the CPU 101 ends the preview function and then advances the processing to step S2201. If it is determined that the object 1509 has not been selected (NO in step S2210), the CPU 101 returns the processing to step S2209, thus continuing preview display.

According to the third exemplary embodiment, when a printed product is previewed on the display unit 105 of the image forming apparatus, to check a color tone, it becomes possible to conform environmental light in a place (viewing place 1404) at which to view the printed product and environmental light in a place (working place 1401) at which to view the previewed image to each other. This enables simply checking the color tone by preview without performing printing.

In a fourth exemplary embodiment, the case of, when there is a window in a viewing place and, for example, environmental light such as sunlight affects a viewing environment for a printed product, bringing an illumination lamp close to viewing illumination information with use of a color illuminance meter is described. Unless otherwise stated, the fourth exemplary embodiment is similar to the first exemplary embodiment, and the same constituent elements as those in the first exemplary embodiment are assigned the respective same reference characters and the detailed description thereof is omitted.

Furthermore, in the following description, only differences from the first exemplary embodiment are described in detail.

<Description of Viewing Place 1710>

Figure 22:
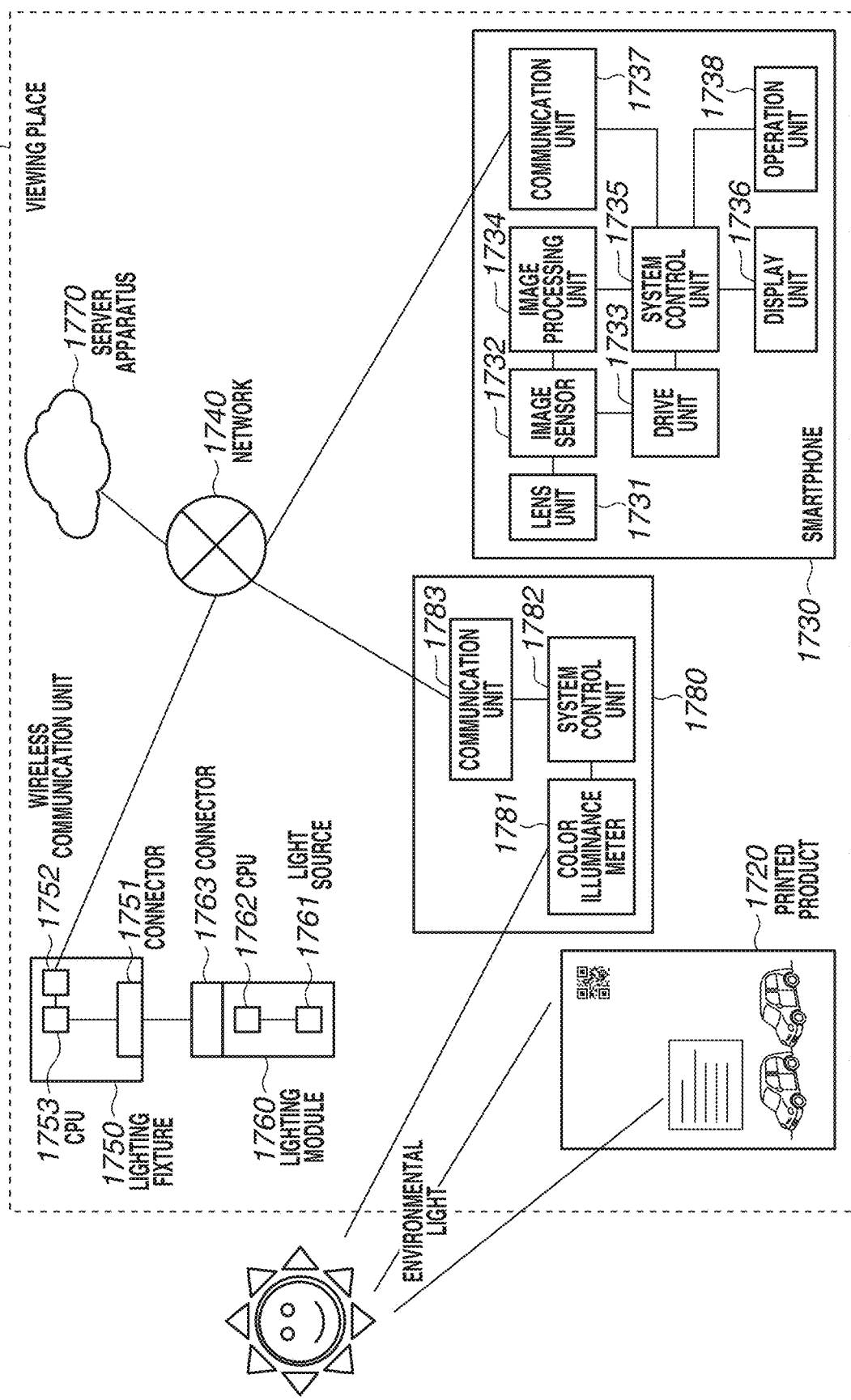
FIG. 22 is a conceptual diagram illustrating a configuration of a viewing place according to a fourth exemplary embodiment.

FIG. 22 is a conceptual diagram illustrating a configuration of a viewing place 1710 according to the fourth exemplary embodiment. The viewing place 1710 includes a printed product 1720, a smartphone 1730, a network 1740, a lighting fixture 1750, a lighting module 1760, and a color illuminance module 1780.

More specifically with regard to the above-mentioned configuration, the viewing place 1710 is a place at which to view the printed product 1720.

The printed product 1720 is an object produced by printing an image including, for example, text, a picture, or a photograph on a medium such as a sheet of paper by toner or ink with use of the image forming apparatus 300 illustrated in FIG. 1.

The network 1740 is, for example, a LAN, the Internet, or an intranet and can be wired or wireless. The printed product 1720 is an object produced by printing an image including, for example, text, a picture, or a photograph on a medium such as a sheet of paper by toner or ink with use of the image forming apparatus 300 illustrated in FIG. 1.

<Configuration of Smartphone 1730>

The smartphone 1730 has the same configuration as that of the smartphone 730 and, therefore, the description thereof is omitted.

<Configurations of Lighting Fixture 1750 and Lighting Module 1760>

The lighting fixture 1750 has the same configuration as that of the lighting fixture 750 and, therefore, the description thereof is omitted.

The lighting module 1760 has the same configuration as that of the lighting module 760 and, therefore, the description thereof is omitted.

<Configuration of Color Illuminance Module 1780>

The color illuminance module 1780 includes a color illuminance meter 1781, a system control unit 1782, and a communication unit 1783.

The color illuminance meter 1781 acquires illuminance and chromaticity, which are environmental light information.

The system control unit 1782 controls the color illuminance meter 1781 and the communication unit 1783. The system control unit 1782 is connected to the network 1740 via the communication unit 1783.

<Description of Viewing Environmental Illumination Adjustment Processing>

Details of viewing environmental illumination adjustment processing are described with reference to FIG. 23, FIG. 9, and FIG. 10.

FIG. 23 is a sequence diagram of viewing environmental illumination adjustment processing in the fourth exemplary embodiment.

FIG. 9 illustrates examples of screens of the smartphone 1730.

Figure 10:
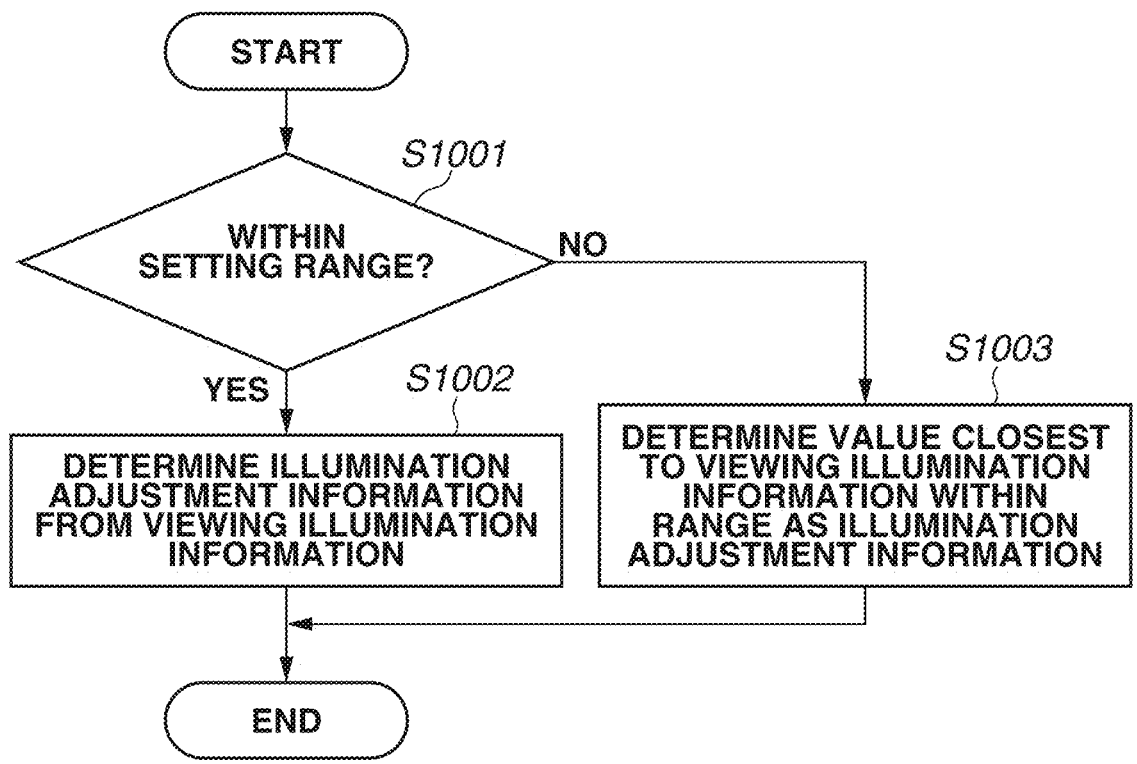
FIG. 10 is a flowchart illustrating processing for determining illumination adjustment information in the first exemplary embodiment.

FIG. 10 is a flowchart of determination processing of illumination adjustment information.

In step S1801, the smartphone 1730 displays a screen 900 illustrated in FIG. 9. The screen 900 is an example of a main screen of an application for performing viewing environmental illumination adjustment processing. An operation of, in the main screen, registering viewing illumination information and illumination information and pressing a "start" object for illumination adjustment enables adjusting the selected illumination lamp. In response to a viewing person performing a touch operation on an object 901, the display unit 1736 displays a screen 910. The screen 910 is a screen which is used to perform image capturing of a two-dimensional barcode with use of the smartphone 1730.

An image capturing area screen 911 is a region which displays an image which is being captured by the smartphone 1730. A guide frame indicating a position to which to fit a two-dimensional barcode is displayed in the image capturing area screen 911. Upon succeeding in reading of the two-dimensional barcode, the smartphone 1730 ends reading processing of the two-dimensional barcode.

In step S1802, the system control unit 1735 analyzes information read from the two-dimensional barcode. As a result of analysis, the system control unit 1735 acquires, as viewing illumination information, information indicating correlated color temperature "5000 (K)" and illuminance "30 (lx)".

The system control unit 1735 detects a two-dimensional barcode from image data acquired by scanning. While, here, a case where a two-dimensional barcode, which is a typical two-dimensional code, is used as a code image to be appended to an original is described as an example, the code image is not limited to the two-dimensional barcode. For example, the code image can be a one-dimensional code or an image obtained by coding specific information intended for, for example, document management or copying limitation, such as a digital watermark.

The system control unit 1735 analyzes the two-dimensional barcode to acquire viewing illumination information and thus completes registration of the viewing illumination information.

In step S1803, the smartphone 1730 displays a screen 920. The screen 920 is a main screen. In response to the viewing person performing a touch operation on an object 921, the display unit 1736 displays a screen 930. The screen 930 displays a list of lighting fixtures, which are capable of communicating with the smartphone 1730, present near the smartphone 1730.

In response to the viewing person performing a touch operation on an object 931, the smartphone 1730 connects to the lighting fixture 1750 via the communication unit 1737 and the network 1740, and requests illumination information about the lighting module 1760.

In step S1804, the lighting fixture 1750 communicates illumination information about the lighting module 1760 to the smartphone 1730. The illumination information is information composed of correlated color temperature and luminous flux.

In step S1805, the smartphone 1730 determines illumination adjustment information from the acquired viewing illumination information and the acquired illumination information.

Details of determination processing of the illumination adjustment information are omitted from description.

In step S1806, the smartphone 1730 transmits the illumination adjustment information to the lighting fixture 1750.

In step S1807, the lighting fixture 1750 transmits the illumination adjustment information to the lighting module 1760.

In step S1808, the lighting module 1760 controls the light source 1761 based on the received illumination adjustment information.

In step S1809, upon completion of performing control, the lighting module 1760 communicates control completion to the lighting fixture 1750.

In step S1810, upon receiving communication of control completion from the lighting module 1760, the lighting fixture 1750 communicates control completion to the smartphone 1730.

In step S1811, to acquire environmental light information about the viewing place 1710, the smartphone 1730 requests environmental light information from the color illuminance module 1780 via the network 1740.

In step S1812, the system control unit 1782 of the color illuminance module 1780 communicates environmental light information acquired by the color illuminance meter 1781 to the smartphone 1730.

In step S1813, the smartphone 1730 determines illumination adjustment information from the viewing illumination information and the environmental light information.

For example, a case where the correlated color temperature of the viewing illumination information is 5000 (K) and the illuminance thereof is 30 (lx) and the correlated color temperature of the environmental light information is 4000 (K) and the illuminance thereof is 50 (lx) is described.

In a case where the correlated color temperature of the viewing illumination information is larger than the correlated color temperature of the environmental light information, the smartphone 1730 adds "1" to the correlated color temperature of the original illumination adjustment information.

In a case where the correlated color temperature of the viewing illumination information is smaller than the correlated color temperature of the environmental light information, the smartphone 1730 subtracts "1" from the correlated color temperature of the original illumination adjustment information.

In a case where the illuminance of the viewing illumination information is larger than the illuminance of the environmental light information, the smartphone 1730 adds "1" to the illuminance of the original illumination adjustment information.

In a case where the illuminance of the viewing illumination information is smaller than the illuminance of the environmental light information, the smartphone 1730 subtracts "1" from the illuminance of the original illumination adjustment information.

In step S1814, the smartphone 1730 transmits the illumination adjustment information to the lighting fixture 1750.

In step S1815, the lighting fixture 1750 transmits the illumination adjustment information to the lighting module 1760.

In step S1816, the lighting module 1760 controls the light source 1761 based on the received illumination adjustment information.

In step S1817, upon completion of performing control, the lighting module 1760 communicates control completion to the lighting fixture 1750.

In step S1818, upon receiving communication of control completion from the lighting module 1760, the lighting fixture 1750 communicates control completion to the smartphone 1730.

Then, the smartphone 1730 checks that differences in correlated color temperature and illuminance between the viewing illumination information and the environmental light information are within the respective threshold values. In a case where the differences are larger than the respective threshold values, step S1813 to step S1818 are repeated. Then, in a case where the differences are smaller than or equal to the respective threshold values, the processing ends.

As described above, according to the fourth exemplary embodiment, it becomes possible to, when there is a window in a viewing place and, for example, environmental light such as sunlight affects a viewing environment for a printed product, bring an illumination lamp close to viewing illumination information with use of a color illuminance meter. This enables performing environmental light correction corresponding to an optional observation light source without putting a load on a viewing person.

While various examples and exemplary embodiments of the disclosure have been described above, the gist and scope of the disclosure are in no way limited to specific descriptions in the present specification.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-084710 filed May 13, 2020, which is hereby incorporated by reference herein in its entirety.

What is claimed is:

1. An information processing system comprising:
an information apparatus configured to process information; and
a lighting apparatus configured to emit light,
wherein the information apparatus includes:
a reading unit configured to read an image including predetermined information;
a first acquisition unit configured to acquire first illumination information from the predetermined information read by the reading unit;
a second acquisition unit configured to acquire second illumination information, which indicates capability information about the lighting apparatus; and
a generation unit configured to generate third illumination information, which is to be transmitted to the lighting apparatus, based on the first illumination information and the second illumination information, and
wherein the lighting apparatus controls emitting the light based on the third illumination information.

2. The information processing system according to claim 1, further comprising a printing apparatus configured to print an image on a sheet,
wherein the printing apparatus includes a second generation unit configured to generate the predetermined information based on the first illumination information, and a printing unit configured to print the predetermined information generated by the second generation unit and an image on a sheet.

3. The information processing system according to claim 2,
wherein the printing apparatus further includes a reception unit configured to receive an instruction from a user, and
wherein the first illumination information is correlated color temperature and illuminance of light received by the reception unit from the user.

4. The information processing system according to claim 2, wherein the printing apparatus further includes a receiving unit configured to receive data that is based on the image via a network.

5. The information processing system according to claim 1, further comprising a measurement apparatus configured to measure correlated color temperature and illuminance of light,
wherein the second illumination information is the correlated color temperature and illuminance measured by the measurement apparatus.

6. The information processing system according to claim 1, wherein the second illumination information is information about a lower limit and an upper limit of correlated color temperature and information about a lower limit and an upper limit of illuminance for the lighting apparatus.

7. The information processing system according to claim 6, wherein, in a case where a value of correlated color temperature and a value of illuminance of the first illumination information are included in the information about a lower limit and an upper limit of correlated color temperature and the information about a lower limit and an upper limit of illuminance for the lighting apparatus of the second illumination information, the third illumination information becomes a value of correlated color temperature and a value of illuminance of the first illumination information.

8. The information processing system according to claim 6, wherein, in a case where a value of correlated color temperature of the first illumination information is not included in the information about a lower limit and an upper limit of correlated color temperature for the lighting apparatus of the second illumination information, a value of correlated color temperature of the third illumination information becomes a value close to the value of correlated color temperature of the first illumination information out of the upper limit or the lower limit of correlated color temperature of the second illumination information.

9. The information processing system according to claim 8, wherein, in a case where a value of luminous flux of the first illumination information is not included in information about a lower limit and an upper limit of luminous flux for the lighting apparatus of the second illumination information, a value of luminous flux of the third illumination information becomes a value close to the value of luminous flux of the first illumination information out of the lower limit or the upper limit of luminous flux of the second illumination information.

10. The information processing system according to claim 1, wherein the information apparatus further includes a third acquisition unit configured to acquire the second illumination information from the lighting apparatus.

11. The information processing system according to claim 1, further comprising a server configured to store information,
wherein the information apparatus further includes a fourth acquisition unit configured to acquire the second illumination information from the server.

12. The information processing system according to claim 1, wherein the information apparatus further includes a transmitting unit configured to transmit the third illumination information to the lighting apparatus via a network.

13. The information processing system according to claim 1, wherein the predetermined information is a two-dimensional code.

14. An information processing apparatus comprising:
a communication unit configured to perform communication with a lighting apparatus;
a reading unit configured to read an image including predetermined information;
a first acquisition unit configured to acquire first illumination information from the predetermined information read by the reading unit;
a second acquisition unit configured to acquire second illumination information, which indicates capability information about the lighting apparatus;
a generation unit configured to generate third illumination information, which is to be transmitted to the lighting apparatus, based on the first illumination information and the second illumination information; and
a control unit configured to cause the lighting apparatus to perform control that is based on the third illumination information.

15. The information processing apparatus according to claim 14,
wherein the communication unit performs communication with a measurement apparatus configured to measure correlated color temperature and illuminance of light, and
wherein the second illumination information is the correlated color temperature and illuminance received from the measurement apparatus.

16. The information processing apparatus according to claim 14, wherein the second illumination information is information about a lower limit and an upper limit of correlated color temperature and information about a lower limit and an upper limit of illuminance for the lighting apparatus.

17. The information processing apparatus according to claim 16, wherein, in a case where a value of correlated color temperature and a value of illuminance of the first illumination information are included in the information about a lower limit and an upper limit of correlated color temperature and the information about a lower limit and an upper limit of illuminance for the lighting apparatus of the second illumination information, the third illumination information becomes a value of correlated color temperature and a value of illuminance of the first illumination information.

18. The information processing apparatus according to claim 16, wherein, in a case where a value of correlated color temperature of the first illumination information is not included in the information about a lower limit and an upper limit of correlated color temperature for the lighting apparatus of the second illumination information, a value of correlated color temperature of the third illumination information becomes a value close to the value of correlated color temperature of the first illumination information out of the upper limit or the lower limit of correlated color temperature of the second illumination information.

19. The information processing apparatus according to claim 18, wherein, in a case where a value of luminous flux of the first illumination information is not included in information about a lower limit and an upper limit of luminous flux for the lighting apparatus of the second illumination information, a value of luminous flux of the third illumination information becomes a value close to the value of luminous flux of the first illumination information out of the lower limit or the upper limit of luminous flux of the second illumination information.

* * * * *